United States Patent
Brisebois et al.

(10) Patent No.: US 9,980,211 B2
(45) Date of Patent: *May 22, 2018

(54) SCANNING OF WIRELESS ENVIRONMENT IN A FEMTO-BASED HOME MACRO SECTOR

(71) Applicant: AT&T Mobility II LLC, Atlanta, GA (US)

(72) Inventors: Arthur Richard Brisebois, Cumming, GA (US); Giuseppe De Rosa, Atlanta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/478,940

(22) Filed: Apr. 4, 2017

(65) Prior Publication Data

US 2017/0208539 A1 Jul. 20, 2017

Related U.S. Application Data

(63) Continuation of application No. 14/805,740, filed on Jul. 22, 2015, now Pat. No. 9,642,080, which is a (Continued)

(51) Int. Cl.
*H04W 48/02* (2009.01)
*H04W 48/08* (2009.01)
(Continued)

(52) U.S. Cl.
CPC ............ *H04W 48/16* (2013.01); *H04W 8/22* (2013.01); *H04W 48/02* (2013.01); *H04W 48/08* (2013.01); *H04W 84/045* (2013.01)

(58) Field of Classification Search
None
See application file for complete search history.

(56) References Cited

U.S. PATENT DOCUMENTS 5,351,235 A 9/1994 Lahtinen
7,945,261 B1 * 5/2011 Spitzer .................... H04W 8/04
370/331

(Continued)

OTHER PUBLICATIONS

Office Action dated Jul. 13, 2011 for U.S. Appl. No. 12/337,139, 22 pages.

(Continued)

*Primary Examiner* — Noel Beharry
*Assistant Examiner* — Nicole King
(74) *Attorney, Agent, or Firm* — Amin, Turocy & Watson, LLP

(57) ABSTRACT

Inter-carrier scanning is triggered in a mobile device based at least in part on location thereof. Femto access point (AP) that can serve the mobile device can determine location through cell or sector identifier that is extracted via scan(s) of macro wireless environment of the femto AP. Femto AP can rank extracted sector identifier(s) and establish home macro sector (HMS) identifier(s), and also can generate scanning requirements for idle-mode scan(s) by a mobile device that operates in a HMS and is authorized to access wireless coverage through the femto AP. Scanning requirement(s) can force periodic inter-carrier measurements of a HMS wireless environment, and establish HMS-specific radio link quality threshold(s). Wireless network can receive at least one of HMS identifier(s) and scanning requirement(s) and deliver same to mobile device(s) authorized to exploit wireless coverage through femto AP associated with the HMS ID(s) and the scanning requirement(s).

20 Claims, 13 Drawing Sheets

Related U.S. Application Data continuation of application No. 13/920,890, filed on Jun. 18, 2013, now Pat. No. 9,125,117, which is a continuation of application No. 12/337,247, filed on Dec. 17, 2008, now Pat. No. 8,487,516.

(51) Int. Cl.
*H04W 48/16* (2009.01)
*H04W 8/22* (2009.01)
*H04W 84/04* (2009.01)

(56) References Cited

U.S. PATENT DOCUMENTS

| | | | |
|---|---|---|---|
| 8,270,431 | B2 | 9/2012 | Brisebois et al. |
| 2007/0097939 | A1 | 5/2007 | Nylander et al. |
| 2008/0268843 | A1 | 10/2008 | Ore et al. |
| 2009/0088131 | A1* | 4/2009 | Gholmieh ............ H04W 48/14 455/410 |
| 2009/0092081 | A1 | 4/2009 | Balasubramanian et al. |
| 2009/0094351 | A1 | 4/2009 | Gupta et al. |
| 2009/0094680 | A1 | 4/2009 | Gupta et al. |
| 2009/0129291 | A1 | 5/2009 | Gupta et al. |
| 2009/0132675 | A1 | 5/2009 | Horn et al. |
| 2009/0280853 | A1 | 11/2009 | Brisebois et al. |
| 2009/0286544 | A1 | 11/2009 | Huber et al. |
| 2010/0099405 | A1* | 4/2010 | Brisebois ............ H04L 41/0893 455/434 |
| 2010/0151857 | A1 | 6/2010 | Brisebois et al. |
| 2010/0151858 | A1 | 6/2010 | Brisebois et al. |
| 2010/0260068 | A1 | 10/2010 | Bhatt et al. |
| 2010/0296410 | A1 | 11/2010 | Kazmi et al. |

OTHER PUBLICATIONS

Office Action dated Jul. 7, 2011 for U.S. Appl. No. 12/337,247, 17 pages.
Office Action dated Nov. 30, 2011 for U.S. Appl. No. 12/337,139, 16 pages.
Office Action dated Nov. 29, 2011 for U.S. Appl. No. 12/337,247, 15 pages.
Notice of Allowance dated May 31, 2012 for U.S. Appl. No. 12/337,139, 21 pages.
Office Action dated May 22, 2012 for U.S. Appl. No. 12/337,247, 19 pages.
Office Action dated Aug. 21, 2012 for U.S. Appl. No. 12/337,247, 22 pages.
Notice of Allowance dated Mar. 19, 2013 for U.S. Appl. No. 12/337,247, 16 pages.
Office Action dated Dec. 18, 2014 for U.S. Appl. No. 13/920,890, 22 pages.
Office Action dated Apr. 19, 2016 for U.S. Appl. No. 14/805,740, 25 pages.
Office Action dated Aug. 8, 2016 for U.S. Appl. No. 14/805,740, 21 pages.

\* cited by examiner

SCANNING OF WIRELESS ENVIRONMENT IN A FEMTO-BASED HOME MACRO SECTOR

CROSS-REFERENCE TO RELATED APPLICATION

This application is a continuation of, and claims priority to each of, U.S. patent application Ser. No. 14/805,740, filed on Jul. 22, 2015, and entitled, "SCANNING OF WIRELESS ENVIRONMENT IN A FEMTO-BASED HOME MACRO SECTOR," which is a continuation of U.S. patent application Ser. No. 13/920,890, filed on Jun. 18, 2013, now U.S. Pat. No. 9,125,117, and entitled, "SCANNING OF WIRELESS ENVIRONMENT IN A FEMTO-BASED HOME MACRO SECTOR," which is a continuation of U.S. patent application Ser. No. 12/337,247, filed on Dec. 17, 2008, now U.S. Pat. No. 8,487,516, and entitled "SCANNING OF WIRELESS ENVIRONMENT IN A FEMTO-BASED HOME MACRO SECTOR". The entireties of each of the above noted applications are hereby incorporated herein by reference.

TECHNICAL FIELD

The subject application relates to wireless communications and, more particularly, to controlling and modifying mobile device scanning operation in idle mode when operating in a macro sector that is home to a femto cell authorized to serve the mobile device.

BACKGROUND

Femto cells—in-building-based wireless access points interfaced with a wired broadband network—are deployed generally to improve or augment indoor macro wireless coverage provided by a wireless network operator. Femto cells typically operate in licensed portions of the electromagnetic spectrum, and generally offer plug-and-play installation; e.g., automatic configuration of femto access point upon provisioning or first power-up. Improved or augmented indoor coverage includes stronger signal and improved reception (e.g., voice or data), ease of session or call initiation, and session or call retention as well. Coverage improvements via femto cells also can also mitigate customer attrition, by providing enhanced subscriber perceived and actual quality of service.

Coverage of a femto cell, or femto AP, is intended to be confined within the bounds of an indoor compound (e.g., a building with multiple floors), in order to mitigate interference among terminals covered by a macro cell and terminals covered by the femto AP. In addition, confined coverage can reduce cross-talk among terminals serviced by disparate, neighboring femto cells as well. To provide coverage, femto cells are typically deployed in frequency carrier(s) that are different from frequency carrier(s) employed in macro cells; for example, femto and macro network within Universal Mobile Telecommunication System (UMTS) deployment operate in such frequency carrier configuration. Thus, to exploit femto coverage, inter-frequency carrier scan(s) of wireless environment are necessary to ensure successful macro-to-femto handoff for devices.

By design and/or protocol, e.g., when operating in a technology framework such as UMTS, mobile devices commonly continue to operate with same radio technology and frequency carrier as long as radio link conditions permit. Battery life conservation and complexity associated with inter-frequency carrier reselection are included among reasons to mitigate switching to a disparate technology or frequency carrier; it takes more power for a mobile device to scan multiple frequency carriers instead of the frequency carrier that currently serves the mobile. Accordingly, inter-frequency carrier, or inter-carrier, scan(s) and reselection are typically conditional rather than routine, occurring only when serving radio link quality is below predetermined thresholds. In summary, intra-carrier reselection is based upon time and best server, but inter-carrier scanning and reselection depend upon loss of received quality relative to a defined threshold.

In deployment scenarios in which femto coverage is provided via different frequency carriers than macro coverage, the conditional nature of inter-frequency carrier scan can cause the mobile device to neglect frequency carrier(s) in which femto coverage is provided in instances (e.g., locations and times) where macro coverage received quality is satisfactory or ideal. Thus, continuation of intra-frequency carrier scanning under adequate macro coverage conditions can prevent the mobile device from reselecting femto coverage even when femto in-building—based service is expected or desired regardless of macro coverage.

DETAILED DESCRIPTION

Figure 1:
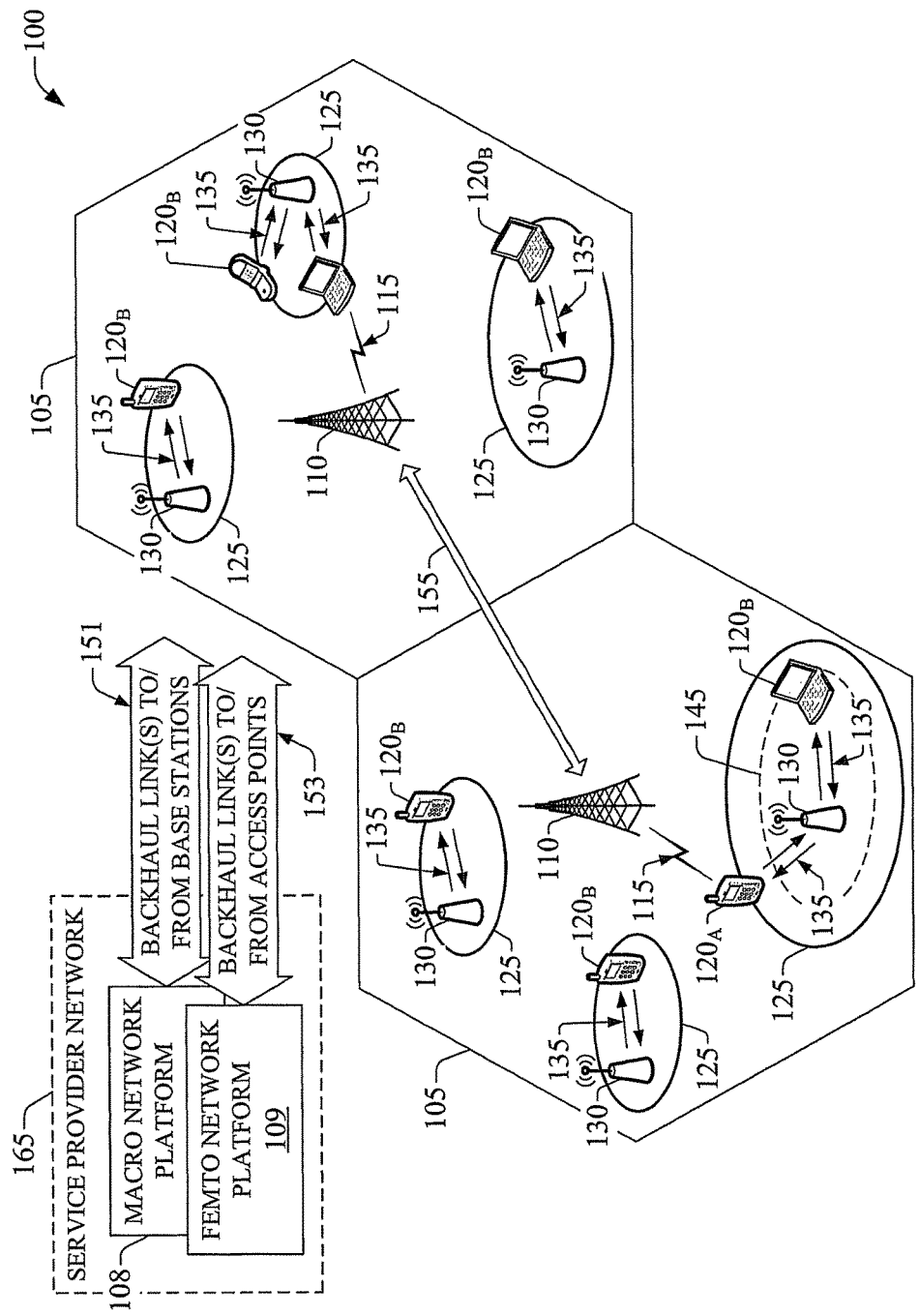
FIG. 1 illustrates a schematic deployment of a macro cells and a femto cells for wireless coverage, wherein femto cell access points can exploit aspects described herein.

The subject application is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "interface," "generator," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. As utilized herein, the term "prosumer" indicate the following contractions: professional-consumer and producer-consumer.

The subject application describes system(s) and method(s) to trigger inter-carrier scanning, or radio link measurements, in idle-mode operation of a mobile device based at least in part on location of the mobile device. Location can be determined through a cell or sector identifier (e.g., an index that defines a pilot sequence that identifies the cell or sector) that is extracted through scan(s) of wireless environment of a femto access point. Femto AP-based scan(s) surveys all radio technologies and frequency carriers that are available in a vicinity of, or surround, the femto AP. Through the femto AP-based scan(s) and a set of ranking criteria that can be established by a network operator, a set of identified macro sectors can be ranked. A set of highly-ranked (e.g., top ranked, top-two ranked . . . ) sector identifiers are extracted and identified as home macro sectors. In an aspect, a single HMS is extracted. The femto AP that identifies the set of home macro sector also can generate a set of scanning requirements for idle-mode scanning operation for a mobile device that operates in a location that corresponds to a HMS, and is authorized to access femto coverage through the femto AP.

In an aspect, the set of scanning requirement(s) forces periodic inter-carrier measurements of a HMS wireless environment. In another aspect, the set of scanning requirement(s) establishes disparate radio link quality and strength threshold(s) from those employed in conventional idle-mode scanning of non-HMS. Scanning requirement(s) is subscriber-station—specific, e.g., those terminals authorized to access the femto AP that generates the scanning requirement(s) as a results of identification of a HMS. Additionally, scanning requirement(s) can be customized, or adjusted, at least on a per-subscriber basis to suit changing requirements, e.g., new deployed radio technology(ies) and newly added frequency carrier(s), and service expectations.

The set of HMS identifiers and the set of scanning requirements are conveyed through a mobile network to a set of mobile devices authorized to exploit wireless femto coverage through the femto AP that conducted the scan(s). Mobile device(s) that receive the HMS identifiers can retain them in at least one of an internal memory or a removable memory. When a macro sector identifier that serves a mobile device matches a HMS identifier, the mobile device switches to idle-mode scanning operation in accordance with received scanning requirement(s). In contrast, normal idle-mode scanning operation and optimal battery life utilization are applied.

Aspects, features, or advantages of the subject embodiments can be exploited in substantially any wireless telecommunication, or radio, technology; for example, Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), High Speed Downlink Packet Access (HSDPA), High Speed Uplink Packet Access (HSUPA), or LTE Advanced. Additionally, substantially all aspects of the subject application can include legacy telecommunication technologies. It should be appreciated that the illustrated selections for radio technology include second generation (2G), third generation (3G), and fourth generation (4G). However, such selection portrays an illustrative example selection and is not intended as a limitation of the subject application and related aspects thereof. In addition, the subject aspects, features or advantages can be exploited in disparate electromagnetic frequency bands.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity).

Referring to the drawings, FIG. 1 illustrates a wireless environment that includes macro cells and femto cells for wireless coverage in accordance with aspects described herein. In wireless environment 100, two areas 105 represent "macro" cell coverage, each macro cell is served by a base station 110. It should be appreciated that macro cells 105 are illustrated as hexagons; however, macro cells can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, like UE $120_A$, in outdoors locations. An over-the-air wireless link 115 provides such coverage, the wireless link 115 comprises a downlink (DL) and an uplink (UL), and utilizes a predetermined band of the radio frequency (RF) spectrum. As an example, UE $120_A$ can be a Third Generation Partnership Project (3GPP) Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 110 communicates via backhaul link(s) 151 with a macro network platform 108, which in cellular wireless technologies (e.g., 3rd Generation Partnership Project (3GPP) Universal Mobile Telecommunication System (UMTS), Global System for Mobile Communication (GSM)) represents a core network. In an aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ). Backhaul pipe(s) 155 link disparate base stations 110.

In wireless environment 100, within one or more macro coverage cell 105, a set of femto cell 125 served by respective femto access points (APs) 130 can be deployed. While in illustrative wireless environment 100 three femto cells are deployed per macro cell, aspects of the subject embodiments are geared to femto cell deployments with substantive femto AP density, e.g., $10^4$-$10^8$ femto APs 130 per base stations 110. A femto cell 125 typically covers an area that includes confined area 145, which is determined, at least in part, by transmission power allocated to femto AP 130, path loss, shadowing, and so forth. While coverage area 125 and confined area 145 typically coincide, it should be appreciated that in certain deployment scenarios, coverage area 125 can include an outdoor portion (e.g., a parking lot, a patio deck, a recreation area such as a swimming pool and nearby space) while area 145 spans an enclosed living space. Coverage area typically is spanned by a coverage radius that ranges from 20 to 100 meters. Confined coverage area 145 is generally associated with an indoor space such as a building, either residential (e.g., a house, a condominium, an apartment complex) or business (e.g., a library, a hospital, a retail store), which encompass a setting that can span about 5000 sq. ft.

A femto AP 130 typically serves a few (for example, 1-5) wireless devices (e.g., subscriber station $120_B$) within confined coverage area 125 via a wireless link 135 which encompasses a downlink and an uplink. A femto network platform 109 can control such service, in addition to mobility handover from macro-to-femto handover and vice versa, and registration and provisioning of femto APs. Control, or management, is facilitated by backhaul link(s) 153 that connect deployed femto APs 130 with femto network platform 109. Backhaul pipe(s) 153 are substantially the same as backhaul link(s) 151. In an aspect of the subject embodiment, part of the control can be effected by femto AP 130 measurements of radio link conditions and other performance metrics. Femto network platform 109 also includes components, e.g., nodes, gateways, and interfaces, that facilitates packet-switched (PS) (e.g., internet protocol (IP)) traffic and signaling generation for networked telecommunication. It should be appreciated that femto network platform 109 can be femto AP 130 can integrate seamlessly with substantially any packet switched (PS)-based and circuit switched (CS)-based network such as macro network platform 108. Thus, operation with a wireless device such as $120_A$ is substantially straightforward and seamless when handover from femto-to-macro, or vice versa, takes place. As an example, femto AP 130 can integrate into an existing 3GPP Core Network via conventional interfaces, or reference links, like Iu-CS, Iu-PS, Gi, Gn.

It is to be noted that substantially all voice or data active sessions associated with subscribers within femto cell coverage (e.g., area 125) are terminated once the femto AP 130 is shut down; in case of data sessions, data can be recovered at least in part through a buffer (e.g., a memory) associated with a femto gateway at the femto network platform. Coverage of a suspended or hotlined subscriber station or associated account can be blocked over the air-interface. However, if a suspended or hotlined customer who owns a femto AP 130 is in Hotline/Suspend status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has a LAC (location area code) and RAC (routing area code) that is different from the underlying macro network. These LAC and RAC are used to identify subscriber station location for a variety of reasons, most notably to direct incoming voice and data traffic to appropriate paging transmitters, and emergency calls as well. As a subscriber station (e.g., UE $120_A$) that exploits macro coverage (e.g., cell 105) enters femto coverage (e.g., area 125), the subscriber station (e.g., UE $120_A$) attempts to attach to the femto AP 130 through transmission and reception of attachment signaling. The signaling is effected via DL/UL 135; in an aspect of the subject embodiment, the attachment signaling can include a Location Area Update (LAU) and/or Routing Area Update (RAU). Attachment attempts are a part of procedures to ensure mobility, so voice calls and data sessions can be established and retained even after a macro-to-femto transition or vice versa. It is to be noted that UE $120_A$ can be employed seamlessly after either of the foregoing transitions. In addition, femto networks typically are designed to serve stationary or slow-moving traffic with reduced signaling loads compared to macro networks. A femto service provider network 165 (e.g., an entity that commercializes, deploys, or utilizes femto access point 130) is therefore inclined to minimize unnecessary LAU/RAU signaling activity at substantially any opportunity to do so, and through substantially any available means. It is to be noted that substantially any mitigation of unnecessary attachment signaling/control is advantageous for femto cell operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE $120_A$ is allowed on femto cell 125, and incoming voice and data traffic are paged and routed to the subscriber through the femto AP 130. To facilitate voice and data routing, and control signaling as well, successful attachment can be recorded in a memory register, e.g., a Visited Location Register (VLR), or substantially any data structure stored in a network memory. It is to be noted also that packet communication (e.g., voice and data traffic, and signaling) typically paged/routed through a backhaul broadband wired network backbone 140 (e.g., optical fiber backbone, twisted-pair line, T1/E1 phone line, digital subscriber line (DSL) either synchronous or asynchronous, an asymmetric DSL, a coaxial cable . . . ). To this end, femto AP 130 is typically connected to the broadband backhaul network backbone 140 via a broadband modem (not shown). In an aspect of the subject embodiment, femto AP 130 can display status indicators for power, active broadband/DSL connection, gateway connection, and generic or specific malfunction. In another aspect, no landline is necessary for femto AP 130 operation.

Figure 2:
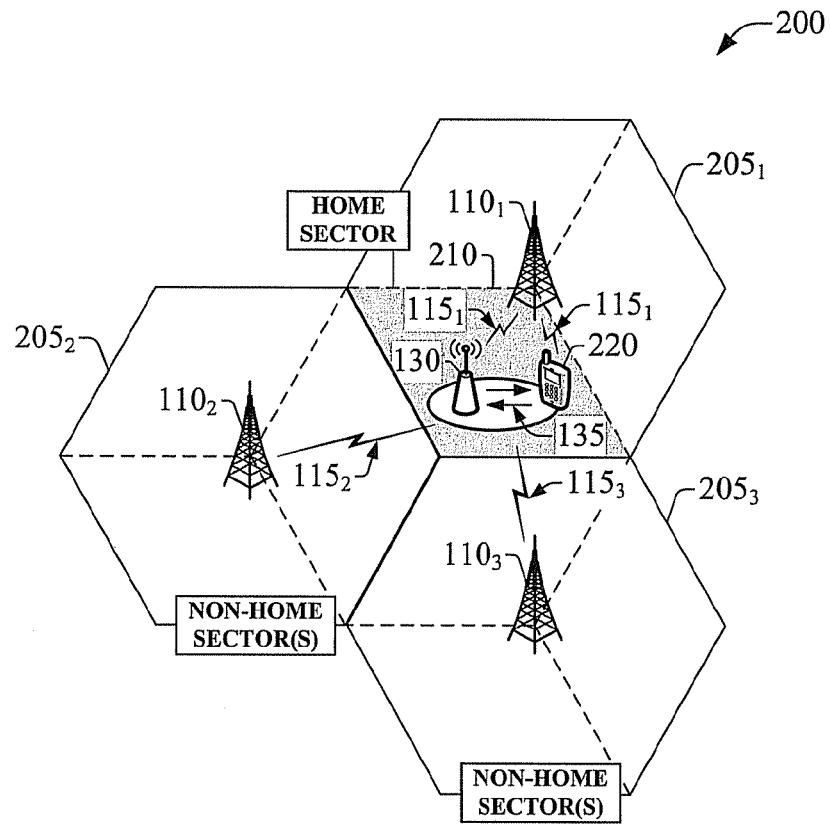
FIG. 2 is a schematic wireless environment that illustrates a set of macro cells and a femto cell with an associated macro home sector in accordance with aspects described herein.

FIG. 2 is a schematic wireless environment 200 that illustrates a set of macro cells and a femto cell with an associated home macro sector in accordance with aspects described herein. Three macro cells $205_1$-$205_3$ comprise the illustrative wireless environment. Coverage macro cells $205_\lambda$ ($\lambda$=1, 2, 3) are illustrated as hexagons; however, coverage cells can adopt other geometries generally dictated by a deployment configuration or floor plan, geographic areas to be covered, and so on. Each macro cell $205_\lambda$ is sectorized in a $\pi$/3 configuration in which each macro cells includes three sectors, demarcated with dashed lines in FIG. 2. It should be appreciated that other sectorizations are possible, and aspects or features of the subject embodiments can be exploited regardless of type of sectorization. It is noted that a set of radio network control node(s), which can be a part of macro network platform; a set of base stations (e.g., Node B $110_\lambda$) that serve a set of macro cells (e.g., $205_\lambda$); electronics, circuitry or components associated with the base stations in the set of base stations; a set of respective OTA wireless links (e.g., links $115_\lambda$) operated in accordance to a radio technology through the base stations; and backhaul links (e.g., links 155, see FIG. 1), form a macro radio access network (RAN). An OTA wireless link $115_\lambda$, associated with a base station $110_\lambda$, facilitates coverage of mobile device $140_\lambda$, through transport of signal(s) and traffic; the wireless link $115_\lambda$ comprises a downlink (DL) and an uplink (UL), and it utilizes a predetermined band of the radio frequency spectrum.

Figure 3:
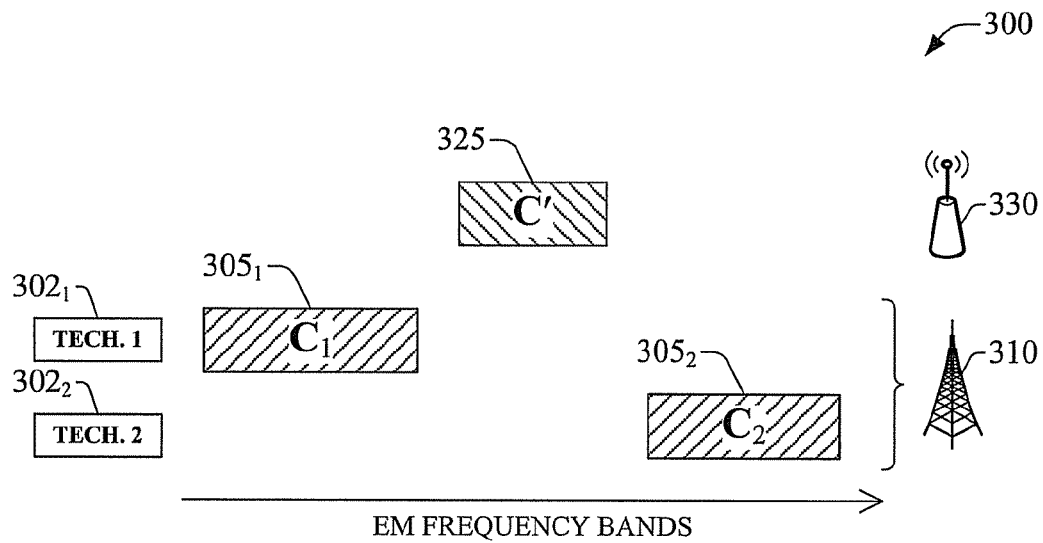
FIG. 3 illustrates an example frequency carrier configuration for a femto access point and a base station that can operate in more that one radio technology in accordance with aspects described herein.

In an aspect of the subject embodiment, to determine a home macro sector 210, femto AP 130 scans macro wireless environment and establishes a ranking of identified macro sectors in accordance to various ranking criteria. Scanning of the macro wireless environment can be triggered in accordance at least in part with a received schedule or event(s). A scan can include survey and comparison of a set of electromagnetic (EM) frequency bands, which can comprise radio frequency (RF) portion(s) and microwave portion(s) of the EM spectrum. In an aspect, the set of EM frequency bands can be determined by a service provider that operates macro and femto networks; for instance, the set of frequency bands can include all EM frequency bands licensed by the service provider (e.g., personal communication services (PCS), advanced wireless services (AWS), general wireless communications service (GWCS), and so forth), and all unlicensed frequency bands currently available for telecommunication (e.g., the 2.4 GHz industrial, medical and scientific (IMS) band or one or more of the 5 GHz set of bands). In addition, a scan can include detection and comparison of pilot signal(s) and system broadcast message(s) associated with one or more radio technologies; for example, Wi-Fi, WiMAX, Enhanced GPRS, 3GPP) LTE, 3GPP2 UMB, HSPA, HSDPA, HSUPA, or LTE Advanced. Generally, such measurements implemented in a scan of wireless environment facilitate identification of frequency carrier(s), radio technology, and macro sector(s) that provide best candidate(s) for outgoing femto-to-macro handover. It should be appreciated that disparate wireless radio technologies can operate generally in disparate frequency carriers; as illustrated in FIG. 3, base station 310 can exploit wireless links according to technology 1 $302_1$ and technology 2 $302_2$ which operate, respectively, in frequency band $C_1$ $305_1$ and frequency band $C_2$ $305_2$. It should be further appreciated that femto frequency carrier C' 325 employed for telecommunication through a femto cell (e.g., femto AP 330) can be distinct from macro frequency carriers, or bands, $C_1$ $305_1$ and $C_2$ $305_2$.

Femto AP 130, based at least in part on a constructed ranking of identified macro sectors, selects a home macro sector 210 and extracts an identifier associated therewith. In an aspect, sector identifier can be a single index, or a composite index, that identifies a pilot signal sequence of scrambling code. It is noted that more than one HMS identifier(s) can be determined; such scenario can occur when more than one macro sector provides top-ranked radio telecommunication condition(s). As an example, a first macro sector operates in 4G technology and display satisfactory radio link quality, and a second macro sector operates in 3G technology with top radio quality metrics. Thus, the first sector can provide voice and data at high speed incurring added signaling as a result of the satisfactory radio link quality, while the second sector can deliver data a lower speed, but with less signaling incurred in view of the superior radio link quality thereof. In view of the illustrated trade-offs between speed and quality, both sectors can rank at the top and therefore be deemed home macro sectors.

It is to be appreciated that the home macro sector(s) and identifier(s) thereof indicate the best and most likely macro sector(s) that serve outside a confined area (e.g., area 125) of femto coverage. It is to be further appreciated that a femto access point (e.g., femto AP 130) can effect a scan macro wireless environment as a part of provisioning, and configuration and initialization when first powered on.

Next, illustrative aspects and features related to generation, dissemination, and utilization of HMS identifier and idle-mode scanning requirements are described in greater detail. In particular, illustrative embodiments of a femto AP, and component(s) therein, that can identify a home macro sector is presented, a network-based illustrative system for dissemination of HMS is shown, and an example embodiment of a mobile handset that exploits a HMS identifier to conduct idle-mode scanning.

Figure 4:
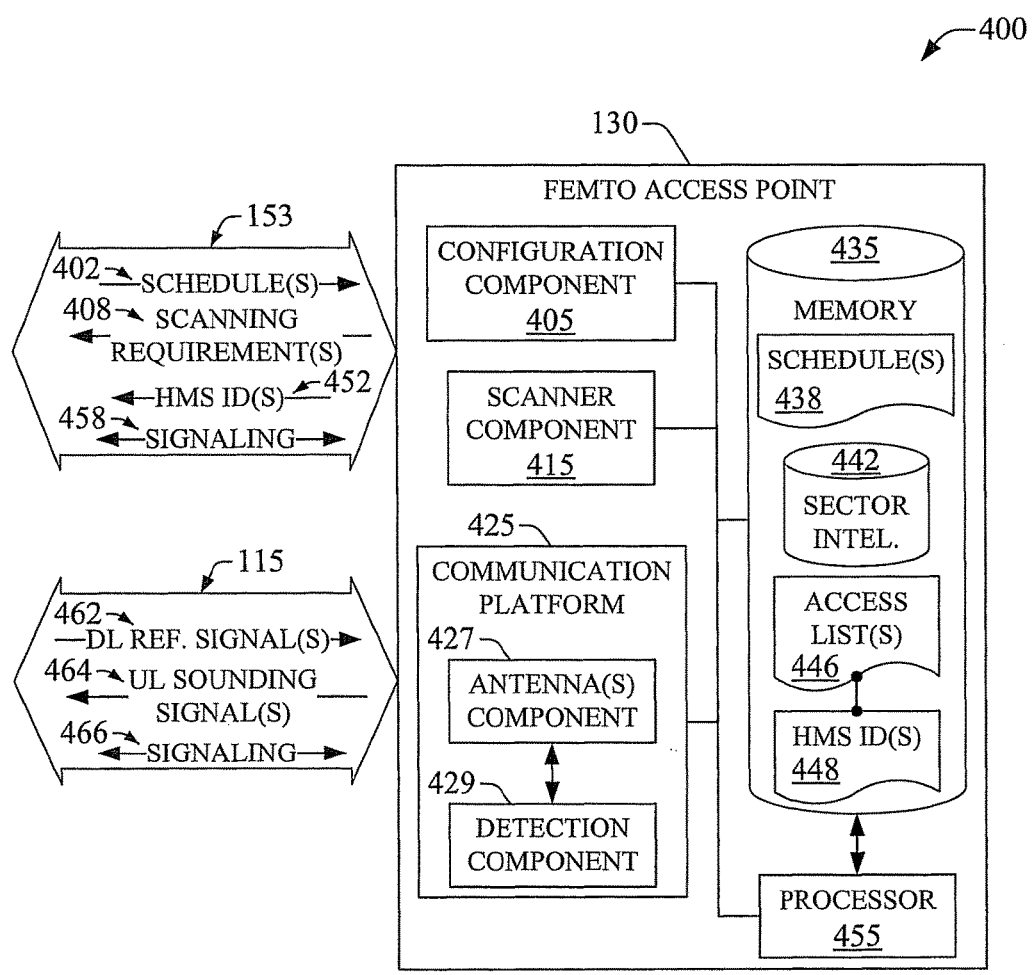
FIG. 4 is a block diagram of an example embodiment of a femto access point that identifies a HMS and generates requirements for idle-mode scanning of a wireless environment in accordance with aspects described herein.

FIG. 4 is a block diagram of an example embodiment 400 of a femto access point that identifies a HMS and generates requirements for idle-mode scanning of a wireless environment in accordance with aspects described herein. Femto AP 130 includes a configuration component 405 that can set up the femto AP 130 in scanning mode in accordance at least in part on received schedule(s) 402; such schedule(s) can be retained in memory element schedule(s) 438. Schedule(s) 402 can facilitate reassessment, through scanning, of macro wireless environment of a femto AP (e.g., femto AP 130) when deployment modification(s) such as cell or sector growth takes place. In an aspect, a network operator can determine schedule(s) 402. Additionally, or alternatively, a scanning request can be indicated through signaling 458; an indication to scan can be event-based such as when at least one of new sector(s) are added to a wireless network, new radio technologies are deployed, or new frequency carriers are utilized for communication. Scanner component 415 can survey wireless environment (e.g., wireless environment 200), including frequency carriers associated with macro wireless signals, such as $C_1$ 305$_1$ and $C_2$ 305$_\lambda$ and frequency carrier(s) (e.g., C' 325) associated with femto AP wireless signal. To conduct a scan that includes intra-frequency scan and inter-frequency carrier scan, scanner component 415 relies at least in part on communication platform 425, which can include antenna(s) component 427 and detection component 429. In an aspect, to conduct a scan, scanner component 415 can configure a transceiver component (not shown) in antenna(s) component 427 to collect signal in a specific frequency carrier (e.g., $C_1$ 305$_1$). Additionally, scanner component 415 can configure demodulation and demultiplexing operation of detection component 429 in accordance with standard various protocols associated with disparate telecommunication technologies; in an aspect, the various protocols and instructions necessary for implementation thereof can reside in memory 435. Scanner component 415 can decode received signal and thus determine macro sector identifier(s). Decoding can be based at least in part on blind decoding of received signal, computation of log-likelihood ratios associated with constellation realization for a specific demodulation; maximum likelihood (ML) estimation, minimum mean square equalization (MMSE), zero forcing (ZF) filtering, or maximal ratio combining (MRC) filtering. To determine code sequences, scanner component 415 can compute cross-correlation of decoded signal(s) and a set of code sequence hypothesis. Code sequence hypothesis (not shown) for various radio technologies can be retained in memory 435. When a code sequence has been determined, an index that identifies a decoded scrambling code can be employed as a sector identifier; the index can be a composite index based at least in part on the type of decoded sequence. Scanner component can identify a set of macro sectors.

Scanner component 415 can gather data on DL signal quality and strength associated with identified sectors. To at least that end, scanner component 415 can gather DL reference signal(s) 462 and analyze such signal(s) to determine DL channel quality or strength. In addition, scanner component 415 can convey UL sounding signal(s) 464 to a group of one or more identified sectors, which communicate with femto AP 130 through links 115, and receive UL signal quality report(s) associated with the conveyed sounding signal(s). Such reports can (i) be embodied in a short message service (SMS) communication, an unstructured supplementary service data (USSD) message, or in one or more bits in at least one of control channel(s), data packet header(s), management frame(s), or management packet(s), and (ii) received through signaling 466. Data on DL/UL radio link quality and strength in addition to information that characterized identified sector(s) such as radio technology can be collected in sector intelligence 442.

Configuration component 405 can utilize the collected sector intelligence 442 to rank the set of identified macro sectors in accordance at least in part with predetermined ranking criteria. Top ranked identified macro sector(s) can be categorized, or further identified, as a home macro sector (HMS) associated with the femto AP 130 that conducts the wireless environment scan; HMS identification(s) (ID(s)) 452 can be conveyed to a femto network platform 109. Home macro sector ID(s) 452 are intended to each mobile device recorded in access list(s) 446, which authorized wireless coverage through femto AP 130. In an aspect, HMS ID(s) 452 can be conveyed when at least one of a scheduled scan, as dictated by schedule(s) 402, or a requested scan, as signaled via signaling 458, reveals the presence of a different or new home macro sector. Configuration component 405 can employ HMS ID(s) 448 as a look-up table to determine whether a HMS is new or different with respect to previously established home macro sectors. In another aspect, a HMS identifier recorded or retained in HMS ID(s) 448 can be conveyed in response to addition of a subscriber station to access list(s) 446, the HMS identifier intended for delivery to the added subscriber station. It is noted that backhaul link 153 can facilitate delivery of HMS ID(s) 452 to femto network platform 109; HMS ID(s) 452 can be relayed there from to macro network platform 108. It is noted that, in an aspect, HMS ID(s) 452 also can be conveyed over-the-air (OTA) through wireless link 135 (not shown in FIG. 4) to a base station and delivered to a macro network platform 108 there from. Additionally, HMS ID(s) 448 can be retained in memory element HMS ID(s) 448. An identifier of HMS (e.g., HMS 210) is associated or linked to each mobile device unique identifier in access list(s) 446 that authorize access to femto coverage. It should be appreciated that while access list(s) 446 linked to HMS ID(s) 448 is illustrated as retained within memory 435 in femto AP 130, linked access list(s) 446 also can be stored in a femto network platform (e.g., a femto gateway node or memory associated therewith) or a memory (not shown) external, or offline, to femto AP 130 or femto network platform 109. Unique identifier(s) can include an international mobile subscriber identity (IMSI), an international mobile equipment identifier (IMEI), a mobile directory number (MDN), a mobile identification number (MIN), a Telecommunications Industry Association (TIA) electronic serial number (ESN), or a multi-bit identification number like the mobile identity number (MEID). It is noted that substantially any code or token that uniquely identifies a mobile device can be employed to identify an authorized device in access list(s) 446.

In an aspect of the subject embodiment, femto AP 130 can generate and deliver idle-mode scanning requirement(s) 408 for a mobile device camped on a HMS. It is noted that idle-mode operation, or otherwise, of the mobile device camped on the HMS occurs in a mixed femto/macro wireless environment; e.g., an environment that transports wireless signal(s) originated from a femto AP (e.g., femto AP 130) and a macro base station (e.g., Node B $110_1$). Such requirement(s) can drive, or force, periodic scans of wireless environment that include inter-carrier scanning. Additionally, scanning requirement(s) 408 can include a set of radio link quality thresholds that are different from those thresholds employed in non-home macro sectors. It is noted that at least one advantage of generation of scanning requirement(s) 408 at the femto AP level is that such requirement(s) can be determined based at least in part on specific radio conditions local to the femto AP. In an aspect, period t of scans can be configured by femto AP 130, or by a network management component (e.g., a femto gateway node, or a radio network controller). It should be appreciated that scan behavior, as dictated by scan requirement(s) 408, is not based upon radio link quality and is specific to mobile device, and unique identifier associated therewith, authorized to access femto coverage through the femto AP that identified the HMS. In contrast, conventional idle-mode scanning behavior is not specific to mobile device unique identifier authorized to access femto coverage via the femto AP that identifies the HMS; rather, in conventional wireless systems, all mobile devices served by a sector follow idle-mode scanning behavior definition in system messages broadcasted by the sector. It should further be appreciated that, in an aspect of the subject embodiment, home macro sector is included as an additional condition that when met can trigger frequent (with period t) inter-frequency carrier mobile device measurements or scans. At least one advantage of the per-unique-device-identifier idle-mode scanning protocol or mechanism described herein is that it suits a customized femto coverage environment and subscriber experience.

Received signaling 458 also can deliver, or convey, an indication to not generate scanning requirement(s) 408. To reduce processing complexity, one or more wireless network components can generate scanning requirement(s) associated with identified home macro sector(s). Additionally, signaling 458 can deliver status report(s) associated with communication of HMS ID(s) 542 or scanning requirement(s) 408 to mobile devices identified in access list(s) 446; such status reports conveyed by wireless network platform (e.g., femto network platform 109 or one or more components therein) as a part of communication of HMS ID(s) 452 and scanning requirement(s) 408. In an aspect, status report(s) delivered through signaling 458 can be embodied in a set of bits in a control channel or management data packet, one or more bits in a header of data packets, one or more bits in one or more management frames, or the like.

Status report(s) can indicate, for example, whether one or more of intended mobile devices recorded in access list(s) 446 successfully received at least one of HMS ID(s) 452 or scanning requirement(s) 408. When status report(s) delivered through signaling 458 convey that one or more intended mobile devices failed to receive home macro sector identifier(s) or scanning requirement(s), femto AP 130, via configuration component 405, for example, can flag such mobile device(s) within access list(s) 446 and deliver HMS ID(s) 452 and scanning requirement(s) 408 when the mobile device(s) attaches to femto AP 130. Alternatively, or additionally, femto AP 130 can bar access thereto of the mobile device(s) that fail to receive HMS ID(s) 452 or scanning requirement(s) 408, and request a delivery retry cycle. In an aspect, configuration component 405 can reconfigure access list(s) 446 to bar access of such mobile device(s), and can request the delivery retry cycle to one or more wireless network components.

In addition, when one or more mobile devices are removed from access list(s) 446, femto AP 130 can deliver signaling 458 that can convey an indication to the one or more mobile devices that are removed to delete at least one of HMS identifier(s) or scanning requirement(s) stored within respective memory element(s) in the one or more mobile devices that no longer retained in access list(s) 446. It is noted that the one or more mobile devices can be removed temporarily or permanently from access list(s) 446. It is noted that to deliver signaling 458, femto AP 130 can exploit configuration component 405 and communication platform 425.

Example embodiment 400, femto access point 130 includes processor 455 which is configured to confer, and confers, at least in part, the described functionality of the various components included in access point 130. Processor 455 can execute code instructions (not shown) stored in memory 435, or a memory component or element therein, to provide the described functionality. It should be appreciated that processor 455 can be a centralized element or be distributed among the various referenced components.

Figure 5:
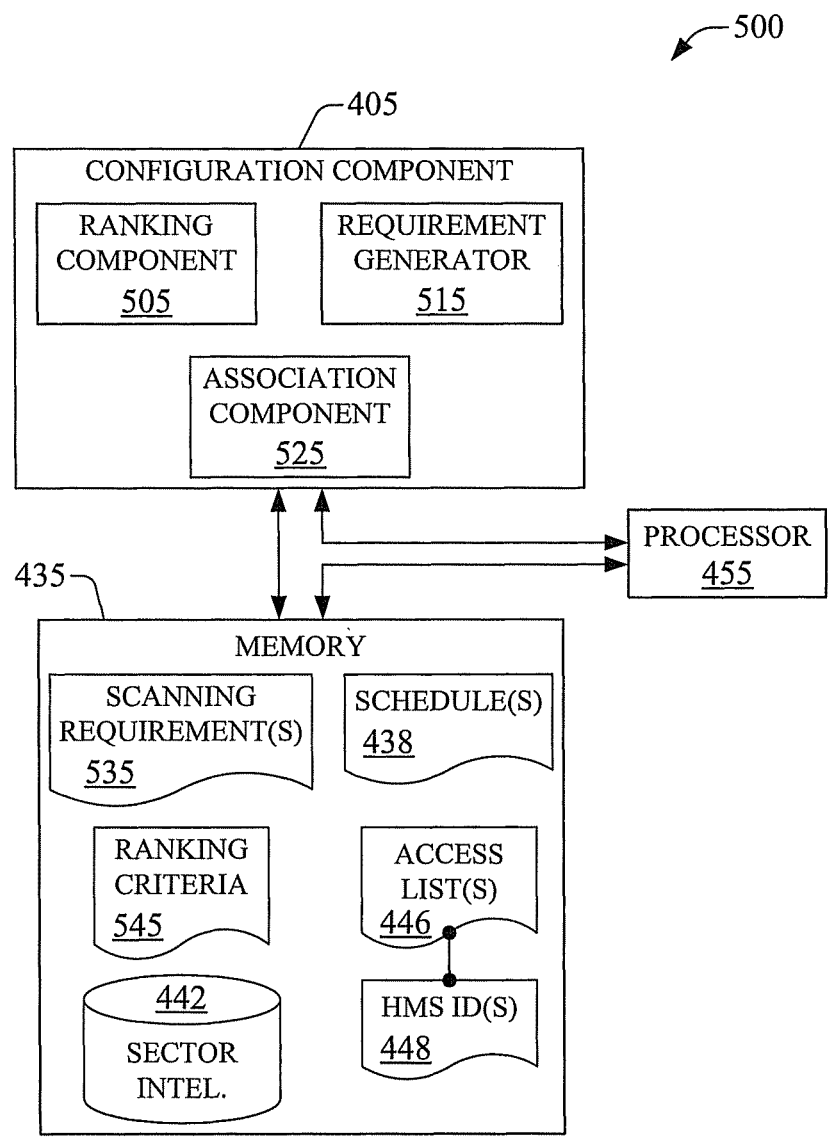
FIG. 5 illustrates a block diagram of an example embodiment of a configuration component that ranks identified macro sectors and generates scanning requirements for HMS in accordance with aspects described herein.

FIG. 5 illustrates a block diagram of an example embodiment 500 of a configuration component that ranks identified macro sectors and generates scanning requirements for HMS in accordance with aspects described herein. In embodiment 500, configuration component 405 includes a ranking component 505 that order or ranks identified sectors based at least in part on ranking criteria 545. In an aspect, ranking component 505 collects information retained in sector intelligence 442 and applies ranking criteria 545 to such information to generate a ranking of identified macro sectors. When such ranking is completed, ranking component 505 can store the ranking in sector intelligence 442. As described above, configuration component 405 can select a top-ranked identified macro sector as a home macro sector; the sector identifier is retained in memory element HMS ID(s) 448.

In addition, configuration component 405 includes a requirement generator 515 that produces a set of requirements for idle-mode scanning of wireless environment for a mobile device that is authorized to access femto coverage via the femto AP (e.g., femto AP 130) that establishes the HMS. Generated requirement(s) can be retained in memory element scanning requirement(s) 535. It should be appreciated that scanning requirement(s) 535 can be delivered at femto AP 130.

Configuration component 405 also includes an association component 525 that links a home macro sector identifier retained in HMS ID(s) 448 with each mobile device unique identifier that comprises access list(s) 446; association component also can update or modify an extant access list to reflect availability of the home macro sector identifier.

Figure 6:
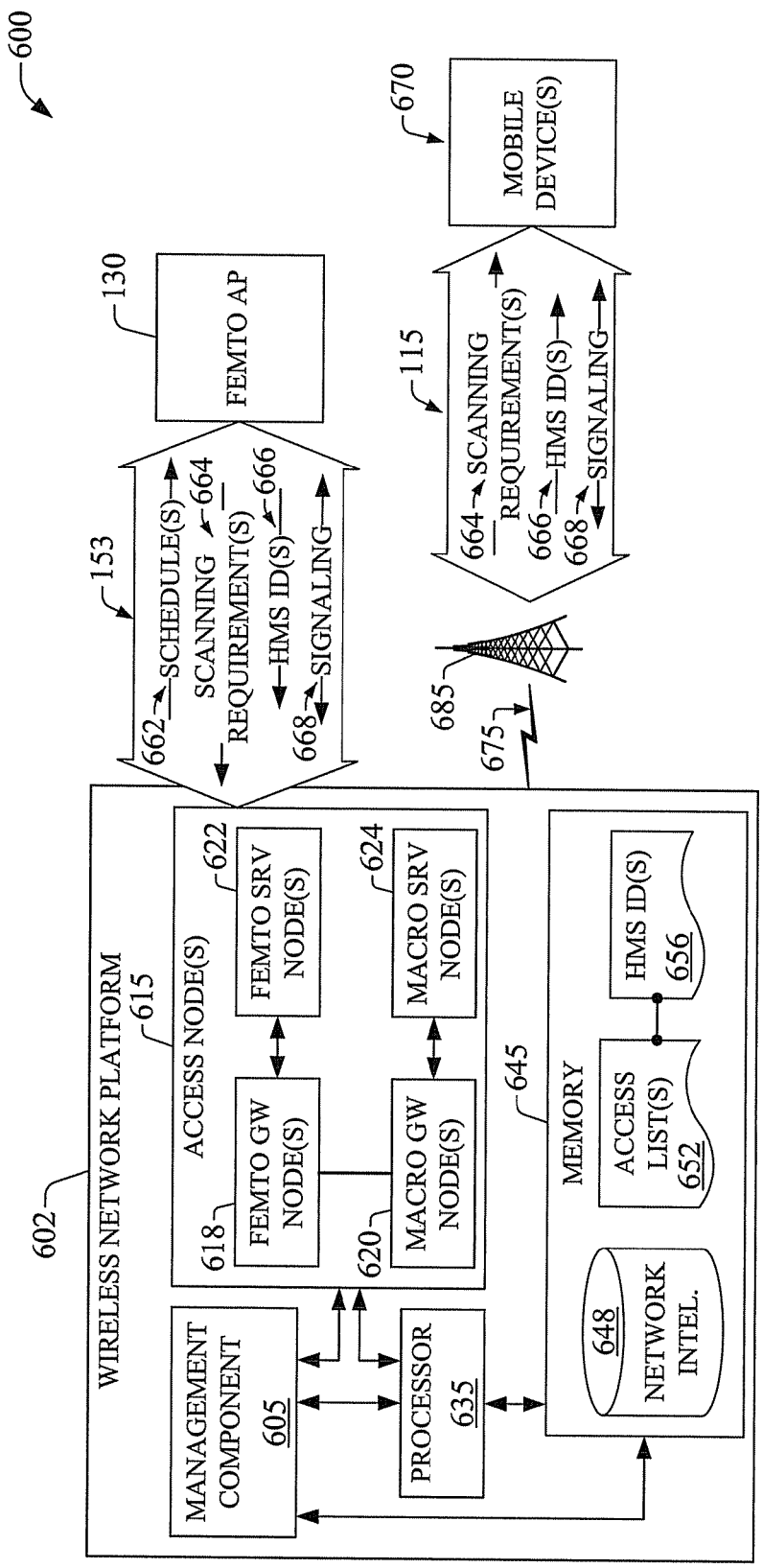
FIG. 6 is a block diagram of an example system 600 that facilitates delivery of home macro sector identifier(s) and a set of scanning requirement(s) to a set of mobile devices authorized to access femto coverage through a femto AP that established the HMS identifier(s) and the set of scanning requirement(s) in accordance with aspects described herein.

FIG. 6 is a block diagram of an example system 600 that facilitates delivery of home macro sector identifier(s) and a set of scanning requirement(s) to a set of mobile devices authorized to access femto coverage through a femto AP that established the HMS identifier(s) and the set of scanning requirement(s) in accordance with aspects described herein. In example system 600, wireless network platform 602 can exploit various radio technologies to communicate wirelessly with mobile device 220 through a RAN that includes backhaul link 675 and base station 685; specific communication via link 675 and operation of base station 185 are dictated by a selected radio technology. Wireless network platform(s) 602 also can facilitate circuit switched (CS)-based (e.g., voice and data) and packet-switched (PS) (e.g., internet protocol (IP), frame relay, or asynchronous transfer mode (ATM)) traffic and signaling generation, and delivery and reception for networked telecommunication, in accordance with various radio technologies. In addition, wireless network platform(s) 602 can control and manage base stations 110$_\lambda$ via, for example, a wireless network management component (e.g., cellular gateway node(s); cellular control node(s) such as RNC node(s)). Moreover, wireless network platform(s) can integrate disparate networks (e.g., macro network(s), femto network(s), Wi-Fi network(s), femto cell network(s), broadband network(s), service network(s), enterprise network(s) . . . ) In cellular wireless technologies (e.g., 3rd Generation Partnership Project (3GPP) Universal Mobile Telecommunication System (UMTS), Global System for Mobile Communication (GSM)), wireless network platform 602 is embodied in a core network and RNC node(s).

Wireless network platform 602, via management component 605 or one or more component therein, conveys schedule(s) 662 to femto AP 130 to supply a set of instances at which femto AP 130 is to scan a macro wireless environment (e.g., wireless environment 200). In an aspect, schedule(s) 662 can be generated by management component 605 based at least in part on network intelligence retained in memory element network intelligence 648 within memory 645. It is noted that, in addition to schedule(s) 662, management component 605 can convey other indication(s) to scan a macro wireless environment. Network intelligence 648 can retain information related to network upgrades such as new deployments of coverage macro cells or sectors; product(s) or service(s) launch planned date(s); addition of new technology layers (e.g., infrastructure and application(s) associated with a technology); reconfiguration of radio resource(s) reuse; or the like. To convey schedule(s) 662, management component 605 delivers schedule(s) 662 to access node(s) 615, which relays schedule(s) 662 to femto AP 130 via backhaul link 153. In an aspect, access node(s) 615 can include femto gateway (GW) node(s) 618 and macro GW node(s) 620, and femto serving node(s) 622 and macro SRV node(s) 624. To relay schedule(s) 664, femto GW node(s) 618 can receive data stream(s) that includes at least in part schedule(s) 664 and convey the data stream(s) to femto SRV node(s) 622 which can deliver the data stream(s) that contain schedule(s) 664 to femto AP 130.

When femto AP 130 identifies a set of home macro sectors and generates scanning requirement(s), the femto AP 130 delivers the identified HMS ID(s) 666 and generated scanning requirement(s) 664 through backhaul link 153. Femto SRV node(s) 622 receive a data stream that carries at least in part HMS ID(s) 666 or scanning requirement(s) 664, and relays the data stream to femto GW node(s) 618, which in turn relays the data stream to (i) macro GW node(s) 620 through a reference link (e.g., Gn in EDGE or 3GPP UMTS), and (ii) management component 605. Macro GW node(s) 620 delivers the data stream to macro SRV node(s) 624 which conveys OTA the data stream that contains at least in part scanning requirement(s) 664 and HMS ID(s) 666. Scanning requirement(s) 664 and HMS ID(s) 666 are delivered through backhaul link 675 to serving base station 685 and to mobile device 115 via wireless link 115. In aspect (i), HMS ID(s) 666 and scanning requirement(s) 664 can be delivered through one or more bits in a frame of a control channel or in a packet header, a multi-bit word in a control channel, or a light-payload (e.g., O(10) bytes) data packet. In aspect (ii), at least one of HMS ID(s) 666 or scanning requirement(s) 664 can be delivered either via at least one of existing SMS mechanisms or USSD mechanisms utilized for legacy roaming profiles. For instance, a SMS Wakeup/WAP Push message is conveyed to mobile device 220, upon such message is acknowledged via signaling 668, management component 605 pushes through a SMS communication at least one of HMS ID(s) 666 and scanning requirement(s) 664 mobile device 220. Alternatively, or in addition, management component 605 can deliver a USSD/WAP Push message to mobile device 220, and communicate via a USSD message at least one of HMS ID(s) 666 and scanning requirement(s) 664 after the USSD/WAP Push message is acknowledged.

In an aspect, successful delivery of HMS ID(s) 666 and scanning requirement(s) 664 can be acknowledged (e.g., via ACK indication, one or more reserved bits in a packet header, a light-payload (e.g., O(1) bytes) data packet, a predetermined multi-bit word conveyed in a radio frame within a control channel . . . ) through signaling 668 by mobile device(s) 670 that successfully receives HMS ID(s) 666 and scanning requirement(s) 664. Acknowledgement can be received by management component 605. In the absence of an acknowledgement indication, management 605 can retry delivery until update confirmation is received, or management component 605 records a "failed delivery" flag in memory 645 after a predetermined number of retry attempts. In addition, a report component (not shown) within management component 605 can report whether at least one of the conveyed HMS identifier(s) or the set of scanning requirements is successfully delivered. In an aspect, report(s) are conveyed via signaling (e.g., signaling 458) to the femto AP that identifies the HMS. A report can be embodied in a SMS message, a USSD message, or one or more bits delivered through a control channel, or a header of a data packet.

Management component 605 can store received home macro sector(s) in memory element HMS ID(s) 656 and link(s) access list(s) 652 thereto; linked access list(s) 652 and HMS ID(s) 656 are retained in memory 645. It should be appreciated that access list(s) 652 includes access list(s) associated with femto AP 130. In another aspect, to reduce complexity at femto AP 130, management component 605, through a configuration component (not shown), can generate scanning requirement(s) for idle-mode scanning behavior, retain the generated scanning requirement(s) and convey the generated scanning requirement(s) to the set of mobile devices 670 authorized to access femto coverage via a femto AP that generated a home macro sector identifier (e.g., HMS ID(s) 666) associated with the generated scanning requirement(s).

Figure 7:
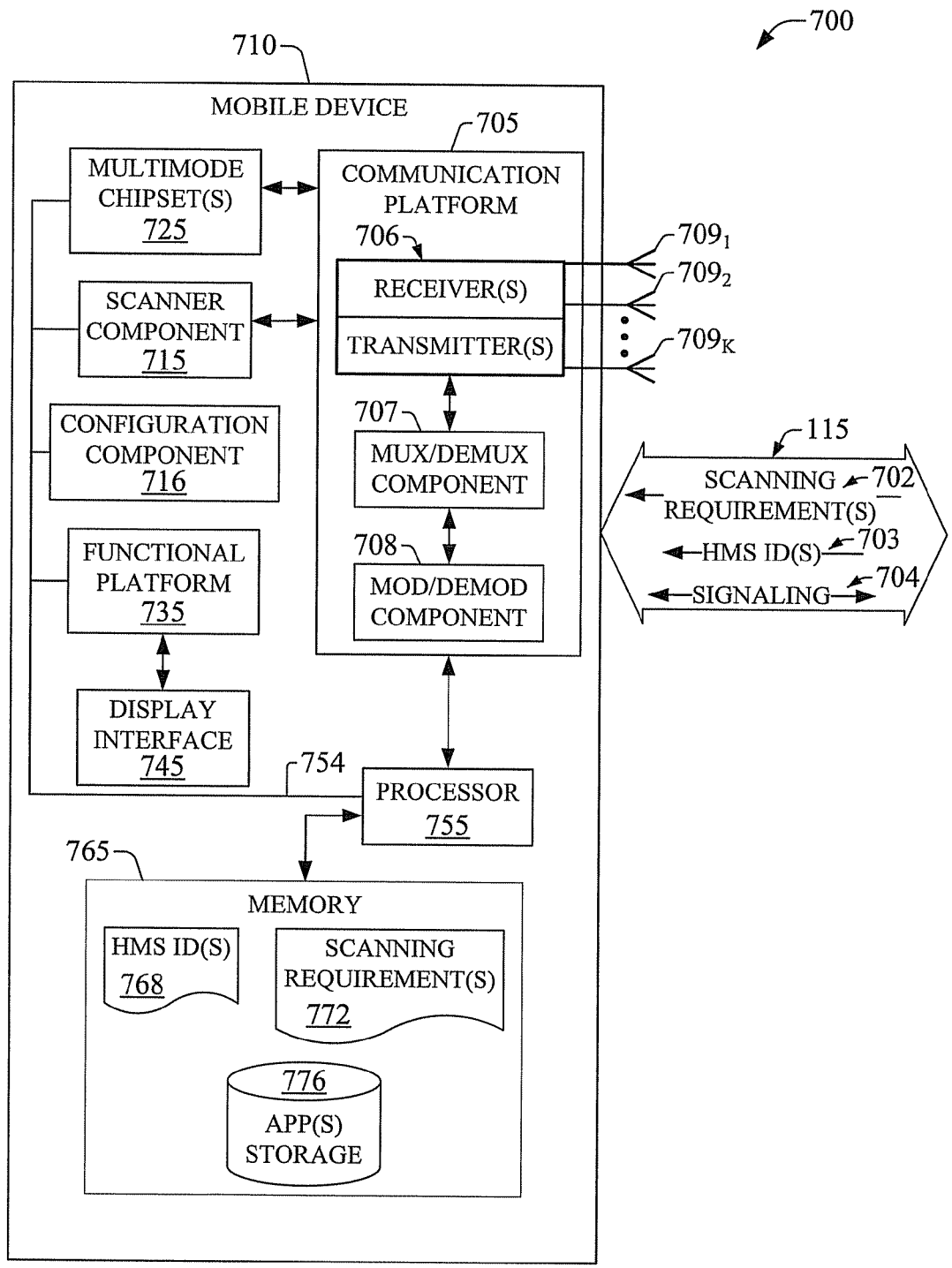
FIG. 7 is a block diagram of an example embodiment 700 of a mobile device that conducts idle-mode scanning of a wireless environment in accordance with aspects disclosed herein.

FIG. 7 is a block diagram of an example embodiment 700 of a mobile device that conducts idle-mode scanning of a wireless environment in accordance with aspects disclosed herein. In an aspect, mobile device 710 embodies mobile device 220. In mobile device 710, which can operate in multi-technology multimode and exploit disparate frequency carriers, a set of antennas 709$_1$-709$_K$ (K is a positive integer) can receive and transmit signal(s) from and to wireless devices like base stations, access terminals, wireless ports and routers, and so forth, that operate in a radio access network, e.g., RAN 685. It should be appreciated that antennas 709$_1$-709$_K$ are a part of communication platform 705, which comprises electronic components and associated circuitry that provide for processing and manipulation of received signal(s) and signal(s) to be transmitted. In an aspect of the subject embodiment, communication platform 705 can receive home macro sector identifier(s) HMS ID(s) 703, and scanning requirement(s) 702 associated therewith. received information can be conveyed to, and retained in, memory 765 via processor 755.

In embodiment 700, communication platform 705 includes receiver(s)/transmitter(s) 706 that can convert signal from analog to digital upon reception, and from digital to analog upon transmission. In addition, receiver/transmitter 706 can divide a single data stream into multiple, parallel data streams, or perform the reciprocal operation; such operations typically conducted in various multiplexing schemes. Functionally coupled to receiver(s)/transmitter(s) 706 is a multiplexer/demultiplexer (mux/demux) component 707 that facilitates manipulation of signal in time and frequency space. Electronic mux/demux component 707 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 707 can scramble and spread information (e.g., codes) according to substantially any code; e.g., Hadamard-Walsh codes, Baker codes, Kasami codes, polyphase codes, and so on. A modulator/demodulator (mod/demod) component 708 is also a part of communication platform 705, and can modulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In an aspect of embodiment 700, mod/demod component 708 is functionally coupled to mux/demux component 667. In embodiment 700, processor 755 facilitates, at least in part, mobile device 710 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

In embodiment 700, multimode chipset(s) 725 allows mobile device 710 to operate in multiple communication modes through various radio network technologies (e.g., 2G, 3G, 4G . . . ) in accordance with disparate technical specifications, or standard protocols, for the radio network technologies. In particular, multimode operation chipset(s) 725 utilizes communication platform 705 in accordance with the standard protocols specific to a mode of operation. In another aspect, multimode operation chipset(s) 725 can be scheduled to operate concurrently (e.g., when K>1) in various modes or within a multitask paradigm. Scanner component 715 can operate, or drive operation of, multimode chipset(s) 725 through selection and realization of one or more radio network technologies for communication in a specific telecommunication mode. Selection of radio technologies and frequency carriers are implemented as part of idle-mode scanning of a wireless environment in which mobile device 705 operates.

In an aspect of the subject embodiment, mobile device 705 receives OTA, via communication platform 705, for example, at least one of a set of scanning requirement(s) 702 and HMS ID(s) 703. The received at least one of a set of scanning requirement(s) 702 and HMS ID(s) 703 can be stored within memory 765, in memory elements scanning requirement(s) 772 and HMS ID(s) 768, respectively. In an aspect, memory 765 can include removable storage capabilities, or elements, that can retain scanning requirement(s) 772 and HMS ID(s) 768; such removable memory elements can include a SIM card, UICC or USIM card, or a RUIM. It is to be noted that mobile device 705 is included within an access list that authorizes the mobile device 705 to be covered through femto coverage associated with the femto AP that identifies the received HMS ID(s) 703 and scanning requirement(s) 702. Mobile device 705 can receive updated home macro sector identifier(s) and scanning requirement(s) for idle-mode scan operation when a femto AP generates new HMS ID(s) 703 and new scanning requirement(s) 702 as a result for a macro network update such as frequency carrier or sector additions, or both.

As described above, scanning requirement(s) 702 can drive, or force, at least in part, mobile device 705 to conduct inter-carrier scanning of wireless environment when the mobile device 705 camps on a home macro sector as identified via HMS ID(s) 703. Additionally, scanning requirement(s) 702 can include at least one of an indication to conduct a scan periodically, wherein the period of the scans is determined by a network operator, or a set of radio link quality threshold(s) that are disparate from thresholds utilized in non-home macro sectors.

In an aspect of the subject embodiment, when mobile device 705 receives HMS ID(s) 703, and scanning behavior requirement(s) 702, mobile device 705 through scanner component 715 can activate an application that, while mobile device 705 is in idle mode, can monitor a received serving sector identifier in order to determine whether the received service sector identifier matches the received and retained HMS ID(s) 703. It should be appreciated that serving sector identifier can be extracted from system and cell broadcast messages received at mobile device 705 through communication platform 705, and decoded by scanner component 715. When scanner component 715, via the activated monitor application, determines that serving macro sector matches a home macro sector identifier retained in HMS ID(s) 768, idle-mode scanning behavior adjusts to scanning in accordance with received scanning requirement(s) retained scanning requirement(s) 772. While in idle-mode, mobile device 705 disregards such scanning indications, or instruction(s), which are employed by other mobile devices that operate in the serving sector and are not authorized to access femto coverage through the femto AP (e.g., femto AP 130) that identified the home macro sector and generated the scanning requirements. Alternatively, when mobile device 705 is not served by the home macro sector, as a result of mobility events, for example, mobile device 705 conducts scans of wireless environment in accordance with conventional system information messages broadcasted by the service macro sector, and delivered through signaling 704.

In another aspect, mobile device(s) 710, through configuration component 716 and communication platform 705, can acknowledge (e.g., via ACK indication, one or more reserved bits in a packet header, a light-payload (e.g., O(1) bytes) data packet, a predetermined multi-bit word conveyed in a radio frame within a control channel . . . ) via signaling 704 successful reception of HMS ID(s) 703 and scanning requirement(s) 702.

In yet another aspect, when mobile device 710 receives, through communication platform 705, an indication that it has been removed from one or more access list(s) that authorize femto coverage, mobile device 710 can delete at least one of HMS identifier(s) or scanning requirement(s) stored within memory 765. Configuration component 716 can facilitate deletion of at least one of HMS identifier(s) or scanning requirement(s).

Mobile device 710 also includes a functional platform 735 that comprises a set of components (not shown) that provide, at least in part, one or more specific functionalities that complement or supplement wireless communication. As an example, in a case mobile device 710 is a telephone, functional component includes functional elements such as a data entry interface (e.g., a keyboard, a biometric pad for biometric-based access, a microphone, a loud speaker . . . ), a camera, peripheral connectors (e.g., a USB port for transferring data to a disparate device), a voice coder-decoder, and so on. It should be appreciated that functional platform 735 can exploit applications stored in application(s) storage 776 within memory 765 to provide one or more functionalities.

Display interface 745, which can reside within functional platform 655 even though it is illustrated as external thereto, facilitates gestures for subscriber-device interaction via at least one of a screen (e.g., a liquid crystal display (LCD), a plasma panel, a monolithic thin-film based electrochromic display . . . ), a sound interface, and so forth. Additionally, display interface 635 can render content(s) that (i) control functionality of mobile device 610 as available in functional platform 655, or (ii) reveal operation conditions thereof.

In addition to HMS ID(s) 768, scanning requirement(s) 772, and application(s) storage 776, memory 765 can store data structures (e.g., metadata); code structure(s) (e.g., modules, objects, classes, procedures) or instructions, or substantially any type of software or firmware that processor 755 can execute to provide functionality associated with substantially any component, platform, interface, selector and so forth, within mobile device 710, in accordance with aspects of the subject embodiment. Moreover, memory 765 can also retain (not shown) network or device information like specifications, address book(s); code sequences for scrambling, spreading, blind decoding hypothesis, semi-persistent scheduling parameters, pilot signal(s) (e.g., reference signal(s)); frequency offsets, cell IDs other than HMS ID(s) 768, and so on. Furthermore, memory 765 also can retain content(s) (e.g., multimedia files, subscriber-generated data); security credentials (e.g., passwords, encryption keys, digital certificates, biometric reference indicators like voice recordings, iris patterns, fingerprints); hardware identifying tokens such as IMSI, a serial product number such as MEID and the like.

Mobile device 710 also includes processor 755 configured to confer, and that confers, functionality, at least in part, to substantially any component, platform, interface, and so forth, within mobile device 710, in accordance with aspects of the subject embodiment. To confer such functionality, processor 755 can exploit, at list in part, data, system, or address bus 754 for data or information exchange. In embodiment 700, processor 755 is illustrated as external to the various functional elements (e.g., components, interfaces, platforms, selectors . . . ) of mobile device 710; however, processor 755 can be distributed across such various functional elements. In addition, processor 755 is functionally coupled (e.g., through a memory bus) to memory 765 in order to store and retrieve information such as code instructions, data structures, etc., necessary to operate and/or confer functionality, at least in part, to communication platform 705, scanner component 715, multimode chipset(s) 725, functional platform 735 and components therein, display interface 745, and other operational components (not shown) of multimode mobile device 710.

In view of the example systems described above, example methods that can be implemented in accordance with the disclosed subject matter can be better appreciated with reference to flowcharts in FIGS. 8-12. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described. It should be further appreciated that the example methods disclosed throughout the subject specification are capable of being stored on an article of manufacture to facilitate transporting and transferring such methodologies to computers for execution, and thus implementation, by a processor or for storage in a memory.

Figure 8:
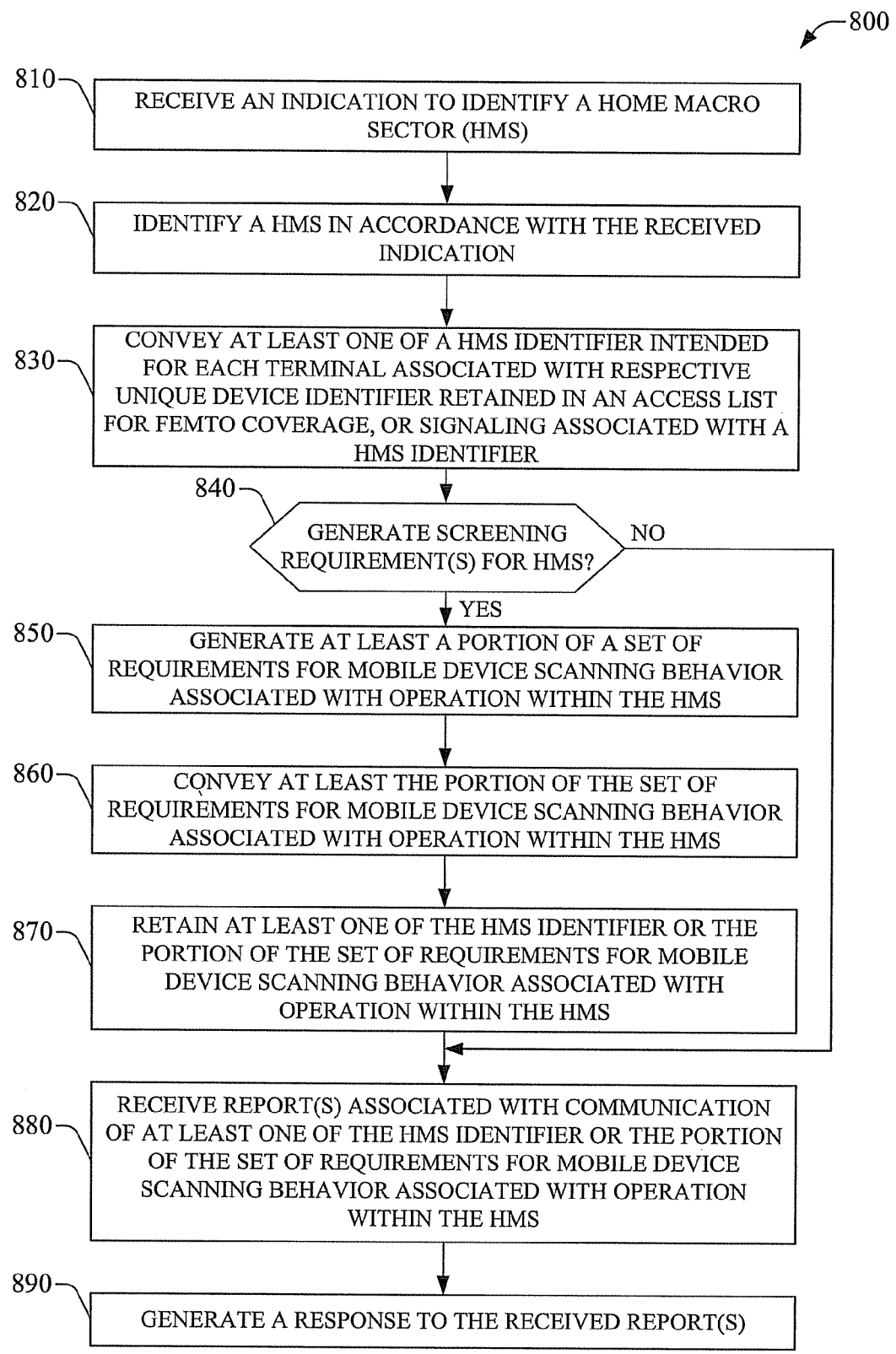
FIG. 8 presents a flowchart of an example method for producing a home sector identifier and a set of idle-mode scanning requirements according to aspects described herein.

FIG. 8 presents a flowchart of an example method 800 for producing a home sector identifier and a set of idle-mode scanning requirements according to aspects described herein. A femto access point can effectuate the subject example method 800. In an aspect, at least one processor that confers, at least in part, functionality to the femto AP can enact the subject example method 800. At act 810, an indication to identify a home macro sector (HMS) is received. The indication can be received from a mobile network platform component, such as a server or gateway node; and it can be received through a broadband backhaul backbone (e.g., backhaul link 153). The indication can be a schedule that establishes a set of instances in which a HMS is to be identified. Alternatively, or in addition, the indication can be embodied in signaling (e.g., signaling 458) to trigger identification of a HMS based at least on an event. At act 820, a HMS is identified in accordance at least in part with the received indication. At act 830, at least one of a HMS identifier intended for each terminal, or mobile device, associated with respective unique device identifier retained in an access list for femto coverage, or signaling associated with a HMS identifier is conveyed. Signaling can be an indication to operate on HMS identifier(s) previously delivered to one or more mobile devices recorded in an access list; the indication can be embodied for example in a SMS communication, a USSD message, or a set of bits delivered in a control channel. In an aspect, a HMS identifier can be conveyed when a scan of macro wireless environment results in a different or new home macro sector. In another aspect, a HMS identifier can be conveyed in response to addition of a subscriber station to the access list. In yet another aspect, signaling associated with a HMS identifier can convey instruction(s) to delete the HMS identifier and related scanning requirement(s) from one or more mobile device removed from access list(s).

At act 840, it is checked whether screening requirement(s) for HMS are to be generated. In an aspect, to perform the checking act, signaling can be probed to determined whether an indication to generate scanning requirement(s) is received. Affirmative outcome of act 840, leads to act 850, wherein at least a portion of a set of requirements for mobile device scanning behavior associated with operation within the HMS is generated. In an aspect, operation includes idle-mode operation. It is noted that operation in idle mode, or otherwise, within the HMS occurs in a mixed femto/macro wireless environment. Conversely, flow is directed to act 880. At act 860, at least the portion of the set of requirements for mobile device scanning behavior associated with operation within the HMS is conveyed. In an aspect, operation includes idle-mode operation. The conveyed operational requirements indicate specifics of scanning such as time interval among execution of scans, or signal quality thresholds associated with received pilot signals within the HMS, such thresholds can be different from their counterparts for non-home macro sectors. At act 870, at least the portion of the set of requirements for mobile device scanning behavior associated with operation within the HMS is retained. In an aspect, operation includes idle-mode operation. At act 880, report(s) associated with communication of at least one of the HMS identifier or the portion of the set of scanning requirements for mobile device scanning behavior associated with operation within the HMS. In an aspect, operation includes idle-mode operation. At act 890, a response to the received report(s) is generated. In another aspect, when at least one of the HMS identifier or the set of scanning requirements fails to be communicated to one or more of the intended mobile devices, the one or more mobile devices are flagged or barred from receiving at least a portion of femto coverage, or a request for a delivery retry cycle is requested (e.g., through signaling 458).

Figure 9:
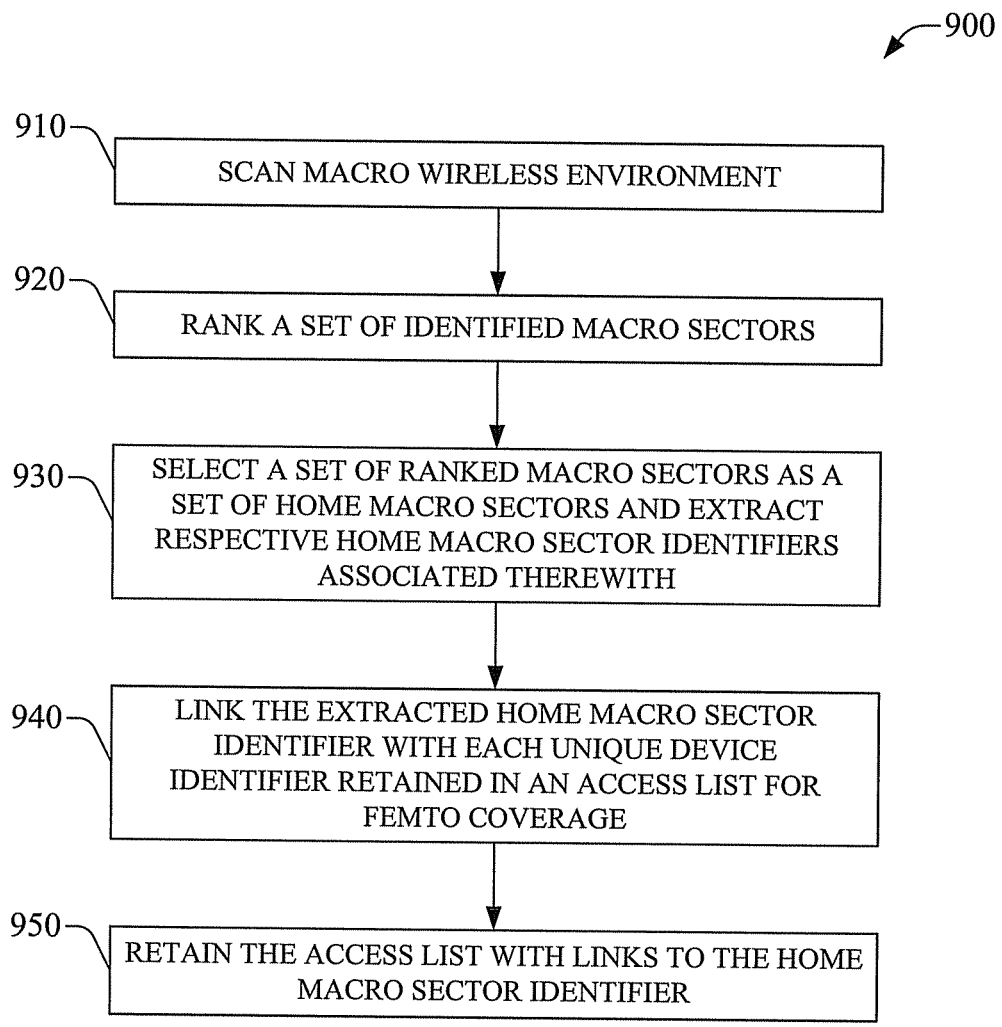
FIG. 9 is a flowchart of an example method for identifying a home macro sector according to aspects described herein.

FIG. 9 is a flowchart of an example method 900 for identifying a home macro sector according to aspects described herein. In an aspect, the subject example method 900 can be utilized in conjunction with example method 800. The subject example method 900 can be implemented by a femto AP, or one or more components that reside therein. A processor that confers, at least in part, functionality to the femto AP can enact the subject example method 900. At act 910, macro wireless environment is scanned. In an aspect, scanning can be effected by scanner component 415. In an aspect, scanning includes surveying and comparing all macro frequency bands, licensed or unlicensed, and radio network technologies. Alternatively, or in addition, scanning of macro wireless environment can include scanning for specific system broadcast messages linked to specific technologies and conveyed through disparate frequency carriers. It should be appreciated that scanning of radio network technologies relies at least in part on detecting various pilot signals in accordance with standardized protocol for each scanned radio technology. At act 920, a set of identified macro sectors is ranked. Ranking can be based upon a ranking criteria that includes at least in part radio technology, utilized carrier frequencies, signal strength and quality considerations. Ranking criteria can be established by a network operator based at least in part on development stages of various served technologies to a marketplace. At act 930, a set of one or more ranked macro sectors is selected as a set of one or more home macro sectors (HMS), and respective home macro sector identifiers associated therewith is extracted. In an aspect, the identifier can be a numeric index that characterizes a pilot code sequence, e.g., a Zadoff-Chu sequence, or a M-sequence.

At act 940, the extracted HMS identifier is linked with each unique device identifier retained in an access list for femto coverage. It is noted that the access list is associated with the femto AP that enacts the subject example method. At act 950, the access list with links to the HMS identifier is retained. Such access list can be retained in at least one of a memory within a femto network platform, a memory that resides within the femto AP, or an offline memory (e.g., a memory external to femto AP or femto network platform) that is functionally coupled to the femto AP. As an example, an offline memory can be a memory within a home-based server within a confined area served through the femto AP.

Figure 10:
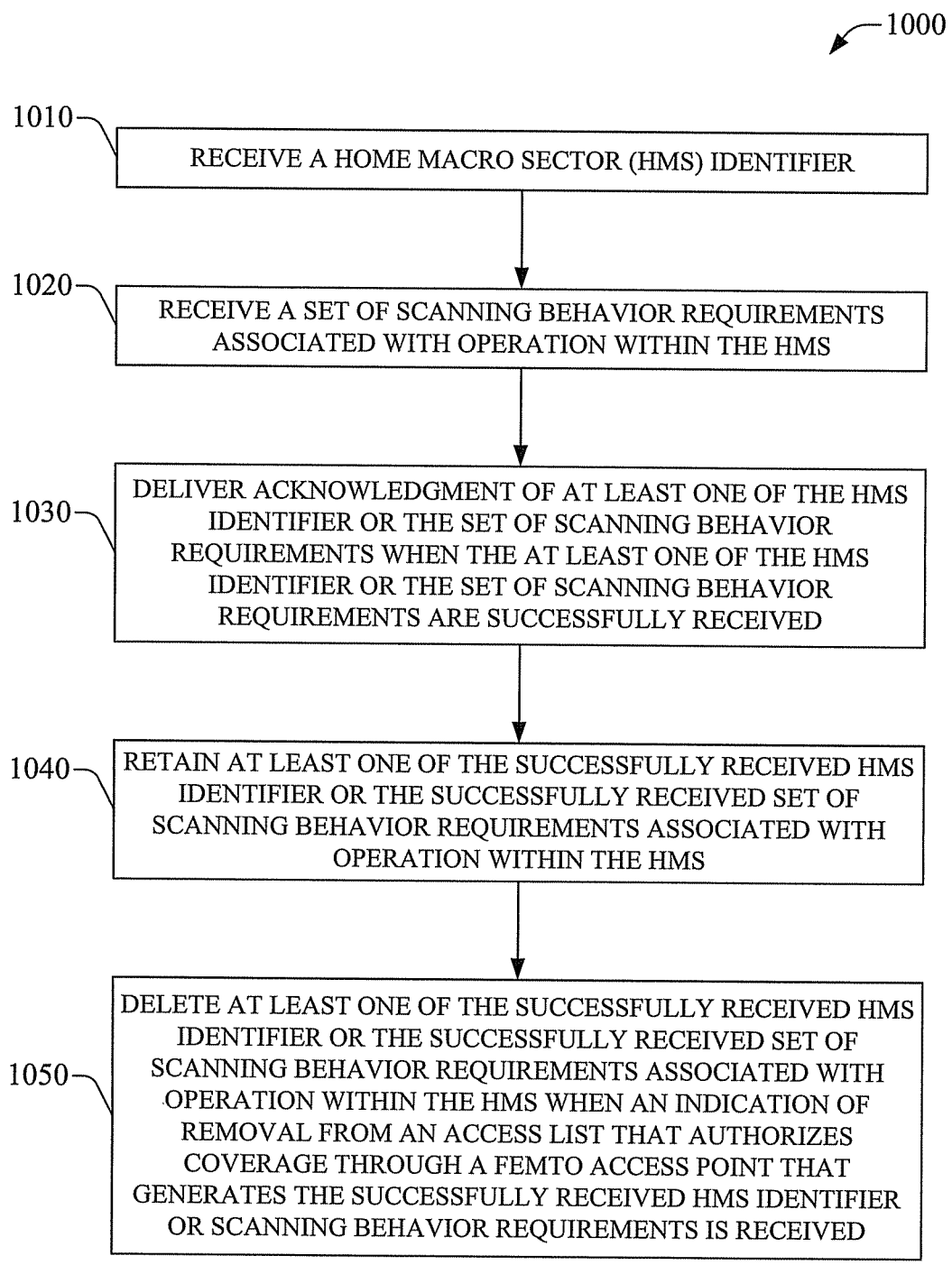
FIG. 10 is a flowchart of an example method for adopting home macro sector features according to aspects described herein.

FIG. 10 is a flowchart of an example method 1000 for adopting home macro sector features according to aspects described herein. A mobile station can effect the subject example method 1000. In an aspect, at least one processor that confers, at least in part, functionality to the mobile station can enact this example method 1000. At act 1010, a home macro sector identifier is received. In an aspect, the HMS identifier can be received through a SMS message, a USSD message, or one or more bits transported in a control channel, or a header of a data packet. At act 1020, a set of one or more scanning behavior requirements associated with operation within the HMS sector is received. Operation within the HMS includes idle-mode operation. In addition, such operation, in idle-mode or otherwise, occurs in a mixed femto/macro wireless environment. In another aspect, the set of one or more scanning behavior requirements can be received through a SMS message, a USSD message, or one or more bits transported in a control channel, or a header of a data packet. In an aspect, the scanning behavior requirements can be associated with idle mode operation of a mobile station, e.g., the mobile station that enacts the subject method. At act 1030, an acknowledgement of at least one of the HMS identifier or the set of scanning requirements is delivered (e.g., via ACK indication, one or more reserved bits in a packet header, a light-payload data packet, a predetermined multi-bit word conveyed in a radio frame . . . ) when the at least one of the HMS identifier or the set of scanning behavior requirements are successfully received. At act 1040, at least one of the successfully received HMS identifier or the successfully received set of scanning behavior requirements associated with operation within the home macro sector is retained. In an aspect, the subject received information can be retained in internal memory or within a removable memory card, e.g., a SIM card or a USIM card, that includes a pertinent IMSI such as an IMSI included in an access list that authorizes utilization of femto coverage by a mobile device linked to the IMSI. At act 1050, at least one of the successfully received HMS identifier or the successfully received set of scanning behavior requirements associated with operation within the HMS is deleted when an indication of removal from an access list (e.g., access list(s) 446) that authorizes coverage through a femto access point that generates at least one of the successfully received HMS identifier or scanning behavior requirements is received.

Figure 11:
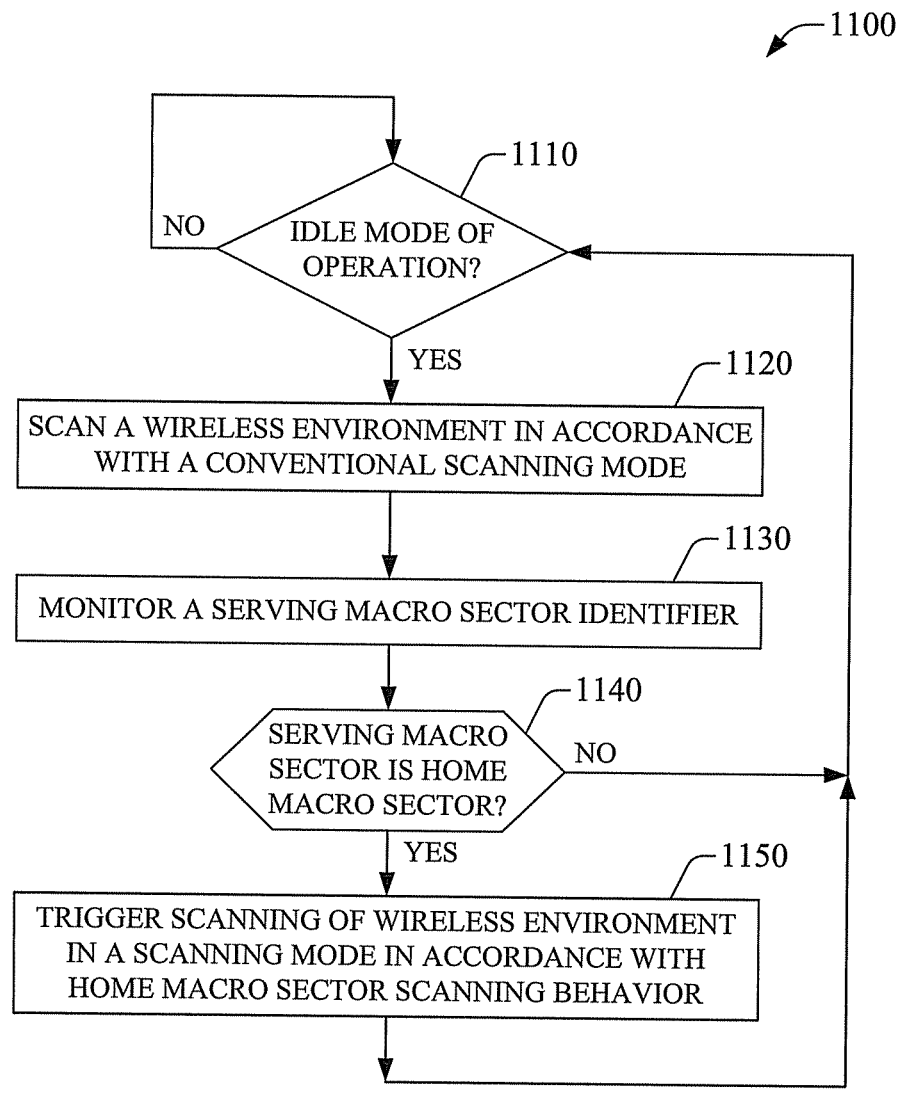
FIG. 11 presents a flowchart of an example method for scanning a macro sector in idle mode according to aspects described herein.

FIG. 11 presents a flowchart of an example method 1100 for scanning a macro sector in idle mode according to aspects described herein. The subject example method 1100 can be enacted in conjunction with example method 1000. A mobile device, or one or more component therein, can effect the subject example method. Alternatively, or in addition, a processor that confers, at least in part, functionality to the mobile device can enact the subject example method 1100.

At act 1110, it is evaluated whether idle mode of operation is in effect or on. In the negative case, the probe continues. In the affirmative case, flow is direct to act 1120, in which a wireless environment is scanned in accordance with a conventional scanning mode. It is noted that conventional scanning mode generally avoids inter-carrier scanning unless a set of serving quality conditions reveals radio link failure, or loss of signal, as determined through a set of signal quality and strength predetermined thresholds. At act 1130, a serving macro sector identifier is monitored. Monitoring can include blind decoding of a set of hypothesis for pilot signal sequences that identify a macro sector. In an aspect, in 3GPP UMTS, a scrambling code associated with the sector can be identified, and sector identifier can be decoded via received system broadcast messages. A dedicated application can effect, at least in part, the sector identifier monitoring. At act 1140, it is determined whether serving macro sector is a home macro sector. Determination can be implemented through comparison of an extracted macro sector identifier extracted in monitoring act 1130 with a look-up table (e.g., HMS ID(s) 768) that includes HMS identifier(s). Such determination also can be implemented, at least in part, via the application that conducts the monitoring in act 1130. When outcome of act 1140 is negative, flow is directed to act 1110. Conversely, in the affirmative case, scanning of wireless environment is triggered in a scanning mode in accordance with HMS scanning behavior at act 1150.

Figure 12:
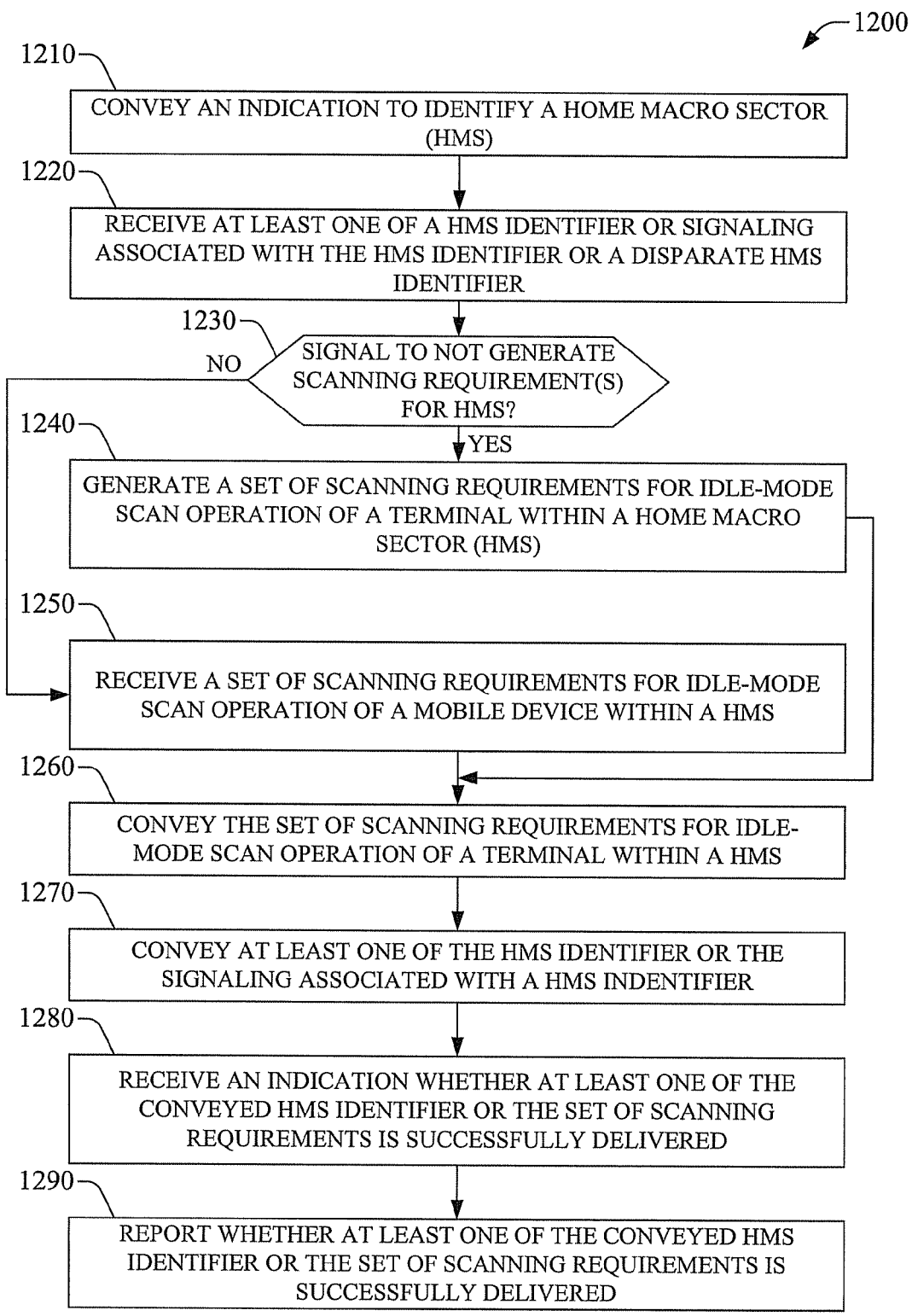
FIG. 12 presents a flowchart of an example method for administering HMS identifier(s) or a set of scanning requirement(s) according to aspects described herein.

FIG. 12 presents a flowchart of an example method for administering HMS identifier(s) or a set of scanning requirement(s) according to aspects described herein. The subject example method 1200 can be enacted by one or more components in a mobile network (e.g., wireless network platform 602). In an aspect, at least one processor the confers at least a portion of the functionality of the one or more components can enact this example method 1200. At act 1210, an indication to identify a home macro sector is conveyed. The indication can be at least one of schedule(s) (see FIG. 6) or scan request delivered through signaling (e.g., signaling 668). At act 1220, at least one of a home macro sector identifier or signaling associated with one of the HMS identifier or a disparate HMS identifier is received. Signaling can be an indication to operate on, or manipulate, HMS identifier(s) previously delivered to one or more mobile devices recorded in an access list; the indication can be embodied for example in a SMS communication, a USSD message, or a set of bits delivered in a control channel. As an example, received signaling associated with a HMS identifier can include instruction(s) to one or more mobile devices to delete a previously delivered HMS identifier or scanning requirements when the one or more mobile devices are removed from an access list (e.g., access list(s) 446) that authorizes femto coverage for the one or more mobile devices through a femto access point (femto AP 130) that generates at least one of the HMS identifier or the scanning requirements. In an aspect, access node(s) 615, e.g., femto GW node(s) 618 and femto SRV node(s) 622, can facilitate reception of at least one of the HMS identifier or the signaling associated with a HMS identifier. At act 1230, it is probed whether to signal to not generate screening requirement(s) for HMS. In an aspect, signaling to not generate screening requirement(s) is conveyed to a femto access point in order to reduce at least in part operational complexity. A positive outcome of act 1230 leads to act 1240, wherein a set of scanning requirements for idle-mode scan operation of a terminal within a home macro sector is generated. Conversely, when outcome is negative, flow is directed to act 1250 in which a set of scanning requirements for idle-mode scan operation of a mobile device within a HMS. At act 1260 the set of scanning requirements for idle-mode scan operation of a terminal within a HMS is conveyed. In an aspect, the set of scanning requirements are conveyed to one or more terminals that are authorized to utilize wireless coverage in a femto AP that identifies the HMS. The set of scanning requirements for idle-mode scan operation can be delivered via a SMS message, a USSD message, or one or more bits transported in a control channel, or a header of a data packet. At act 1270, at least one of the HMS identifier or the signaling associated with a HMS identifier is conveyed. In an aspect, the HMS identifier is conveyed to the one or more terminals described in act 1260. The HMS identifier can be delivered via a SMS message, a USSD message, or one or more bits transported in a control channel, or a header of a data packet. Management component 605 and/or access node(s) 615, e.g., macro GW node(s) 620 and macro SRV node(s) 624, can facilitate delivery the HMS identifier. In another aspect, as described above, conveyed signaling associated with a HMS identifier can include instruction(s) to one or more mobile devices to delete a previously delivered HMS identifier or scanning requirements when the one or more mobile devices are removed from an access list that authorizes coverage for the one or more mobile devices through a femto access point (femto AP 130) that generates at least one of the HMS identifier or the scanning requirements.

At act 1280, an indication is received that makes known whether at least one of the conveyed HMS identifier or the set of scanning requirements is successfully delivered. At act 1290, it is reported whether at least one of the conveyed HMS identifier or the set of scanning requirements is successfully delivered. In an aspect, report(s) are conveyed via signaling (e.g., signaling 458) to the femto AP that identifies the HMS. A report can be embodied in a SMS message, a USSD message, or one or more bits delivered through a control channel, or a header of a data packet.

Figure 13:
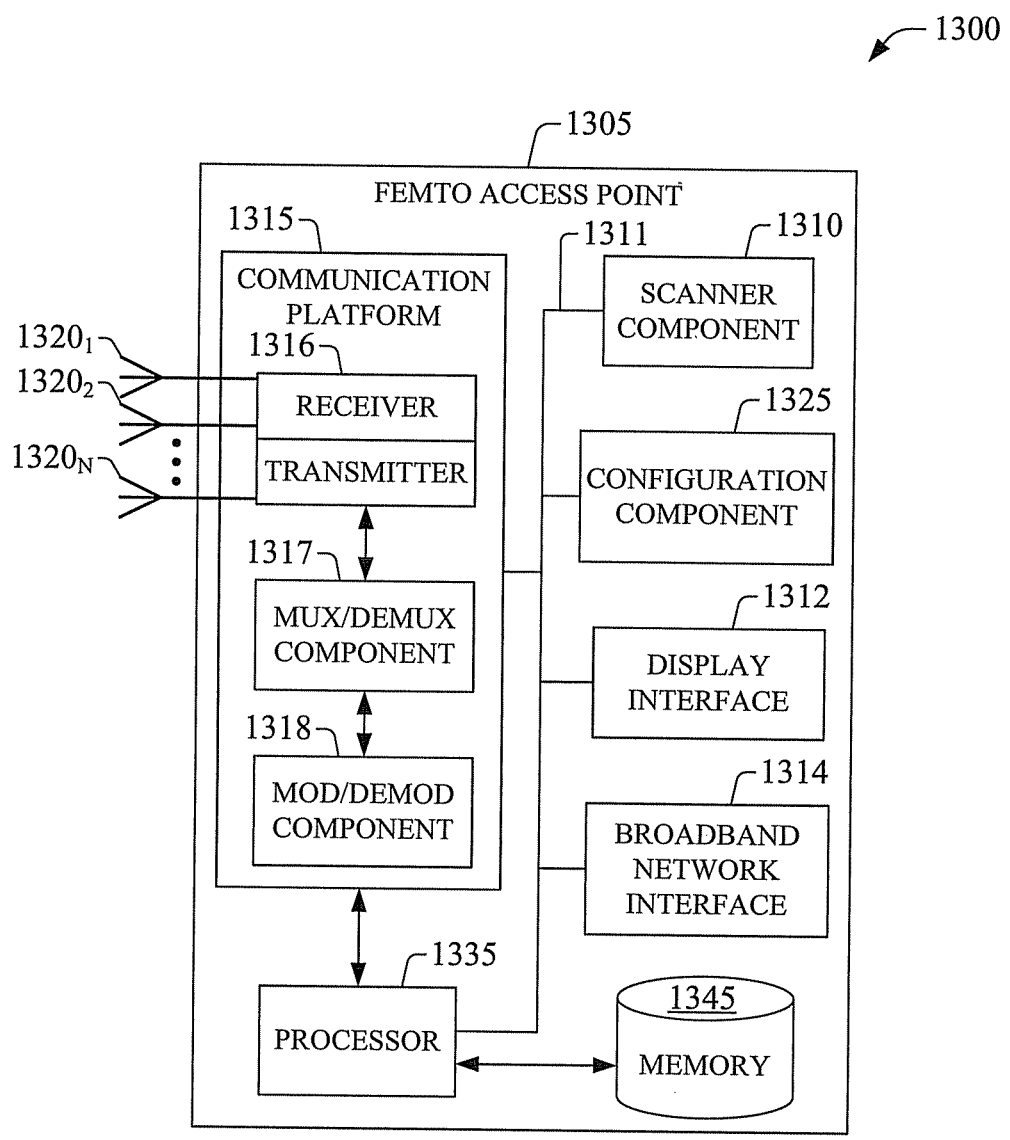
FIG. 13 illustrates a block diagram of an example embodiment of a femto access point that can enable and exploit features or aspects of the subject application.
Figure 14:
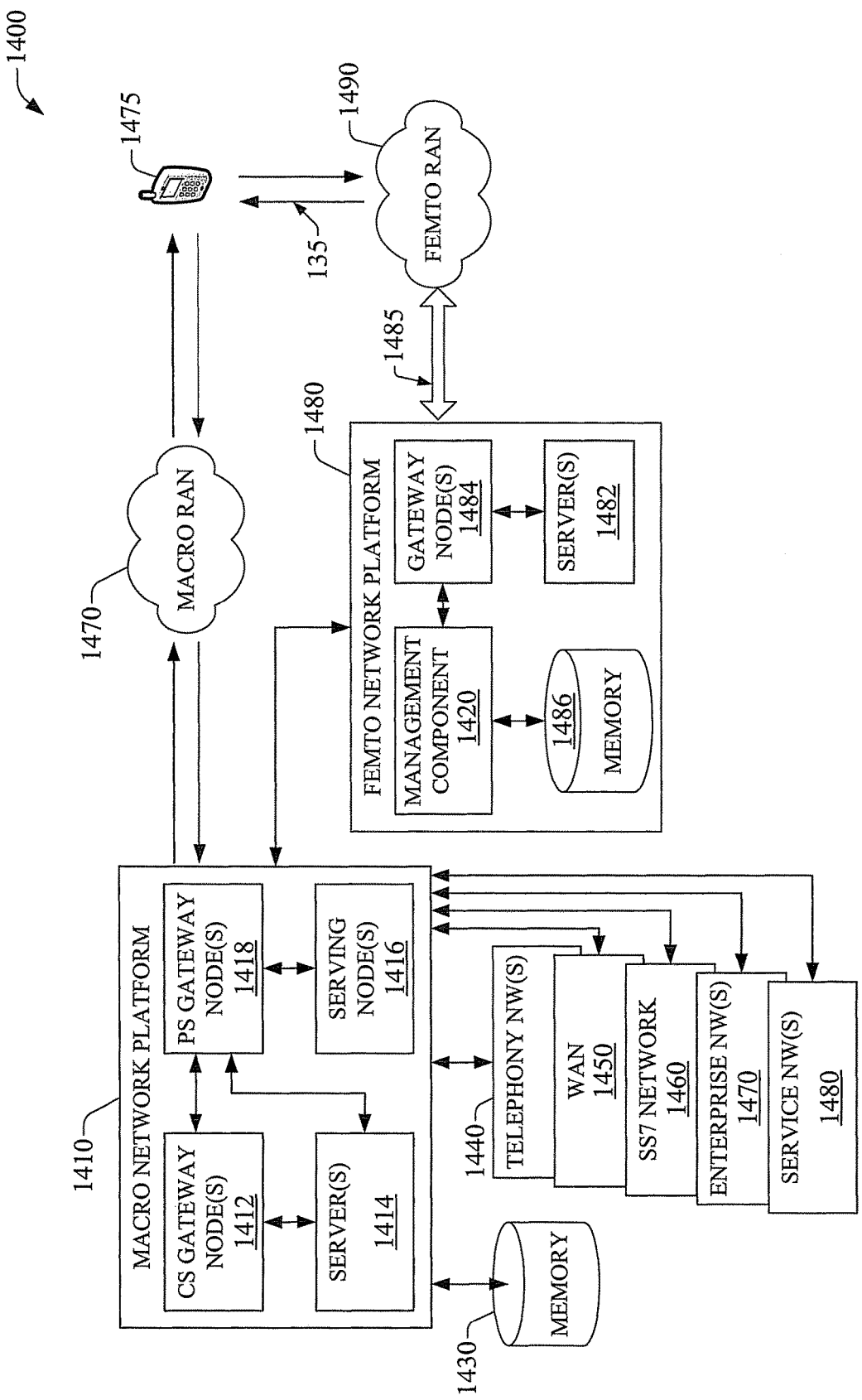
FIG. 14 example wireless network environment that includes femto and macro and that can enable aspects or feature of a mobile network platform as described herein, and utilize femto APs that exploit aspects of the subject application in accordance with various aspects of the subject specification.

To provide further context for various aspects of the subject specification, FIG. 13 and FIG. 14 illustrate, respectively, a block diagram of an example embodiment 1300 of a femto cell access point that can enable or exploit features or aspects of the subject embodiment, and example wireless network environment 1400 that includes femto and macro and that can enable aspects or feature of a mobile network platform as described herein, and utilize femto APs that exploit aspects of the subject embodiment in accordance with various aspects of the subject specification. In embodiment 1300, femto AP 1305 can receive and transmit signal(s) (e.g., attachment signaling) from and to wireless devices like femto access points, access terminals, wireless ports and routers, or the like, through a set of antennas $1320_1$-$1320_N$ (N is a positive integer). It should be appreciated that antennas $1320_1$-$1320_N$ embody antenna(s) component 427, and are a part of communication platform 1315, which comprises electronic components and associated circuitry that provides for processing and manipulation of received signal(s) and signal(s) to be transmitted. Such electronic components and circuitry embody at least in part signaling detection component 285; communication platform 1315 operates in substantially the same manner as communication platform 425 described hereinbefore. In an aspect, communication platform 1315 includes a receiver/transmitter 1316 that can convert signal from analog to digital upon reception, and from digital to analog upon transmission. In addition, receiver/transmitter 1316 can divide a single data stream into multiple, parallel data streams, or perform the reciprocal operation. Coupled to receiver/transmitter 1316 is a multiplexer/demultiplexer 1317 that facilitates manipulation of signal in time and frequency space. Electronic component 1317 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1317 can scramble and spread information (e.g., codes) according to substantially any code known in the art; e.g., Hadamard-Walsh codes, Baker codes, Kasami codes, polyphase codes, and so on. A modulator/demodulator 1318 is also a part of communication platform 1315, and can modulate information according to multiple modulation techniques, such as frequency modulation, amplitude modulation (e.g., M-ary quadrature amplitude modulation (QAM), with M a positive integer), phase-shift keying (PSK), and the like Femto access point 1305 also includes a processor 1335 configured to confer, and confer, at least in part, functionality to substantially any electronic component in femto AP 1305. In particular, processor 1335 can facilitate configuration of femto AP 1305, via configuration component 1325, and one or more component therein, in accordance with various aspects described herein in connection with configuration component 405 and related component(s) or embodiment(s). Additionally, processor 1335 can facilitate scanning of a macro wireless environment through scanner component 1310 in accordance to various aspects described herein in connection with scanner component 405 related component(s) or embodiments.

Additionally, femto AP 1305 includes display interface 1312, which can display functions that control functionality of femto AP 1305, or reveal operation conditions thereof. In addition, display interface 1312 can include a screen to convey information to an end user. In an aspect, display interface 1312 can be a liquid crystal display (LCD), a plasma panel, a monolithic thin-film based electrochromic display, and so on. Moreover, display interface can also include a component (e.g., speaker(s)) that facilitates communication of aural indicia, which can also be employed in connection with messages that convey operational instructions to an end user. Display interface 1312 also facilitates data entry (e.g., through a linked keypad or via touch gestures), which can facilitated femto AP 1305 to receive external commands (e.g., restart operation).

Broadband network interface facilitates connection of femto AP 1305 to femto network via backhaul link(s) 153 (not shown in FIG. 13), which enables incoming and outgoing data flow. Broadband network interface 1314 can be internal or external to femto AP 1305, and it can utilize display interface 1312 for end-user interaction and status information delivery.

Processor 1335 also is functionally connected to communication platform 1315 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 1335 is functionally connected, via data, system, or address bus 1311, to display interface 1312 and broadband network interface 1314 to confer, at least in part functionality to each of such components.

In femto AP 1305, memory 1345 can retain home macro sector identifier(s) (e.g., HMS ID(s) 448); access list(s) (e.g., access list(s) 446) that authorized access to wireless coverage trough femto 1305; sector intelligence (e.g., sector intel 442) which includes ranking of macro sectors in the macro wireless environment of femto AP 1305, radio link quality and strength associated therewith, . . . ; or the like. Memory 1345 also can store data structures, code instructions and program modules, system or device information, code sequences for scrambling, spreading and pilot transmission, femto AP floor plan configuration, and so on. Processor 1335 is coupled, e.g., via a memory bus, to the memory 1345 in order to store and retrieve information necessary to operate and/or confer functionality to the components, platform, and interface that reside within femto access point 1305.

With respect to FIG. 14, wireless communication environment 1400 includes two wireless network platforms: (i) A macro network platform 1410 which serves, or facilitates communication with user equipment 1475 (e.g., mobile 220) via a macro radio access network (RAN) 1470. It should be appreciated that in cellular wireless technologies (e.g., 3GPP UMTS, HSPA, 3GPP LTE, 3GPP2 UMB), macro network platform 1410 is embodied in a Core Network. (ii) A femto network platform 1480, which can provide communication with UE 1475 through a femto RAN 1490, which is linked to the femto network platform 1480 via backhaul pipe(s) 1485 (e.g., backhaul link(s) 153). It should be appreciated that macro network platform 1410 typically hands off UE 1475 to femto network platform 1410 once UE 1475 attaches (e.g., through macro-to-femto handover) to femto RAN 1490, which includes a set of deployed femto APs (e.g., femto AP 130) that can operate in accordance with aspects described herein.

It is noted that RAN includes base station(s), or access point(s), and its associated electronic circuitry and deployment site(s), in addition to a wireless radio link operated in accordance with the base station(s). Accordingly, macro RAN 1470 can comprise various coverage cells like cell 105, while femto RAN 1490 can comprise multiple femto cell access points such as femto AP 130. Deployment density in femto RAN 1490 is substantially higher than in macro RAN 1470.

Generally, both macro and femto network platforms 1410 and 1480 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject embodiment, macro network platform 1410 includes CS gateway node(s) 1412 which can interface CS traffic received from legacy networks like telephony network(s) 1440 (e.g., public switched telephone network (PSTN), or public land mobile network (PLMN)) or a SS7 network 1460. Circuit switched gateway 1412 can authorize and authenticate traffic (e.g., voice) arising from such networks. Additionally, CS gateway 1412 can access mobility, or roaming, data generated through SS7 network 1460; for instance, mobility data stored in a VLR, which can reside in memory 1430. Moreover, CS gateway node(s) 1412 interfaces CS-based traffic and signaling and gateway node(s) 1418. As an example, in a 3GPP UMTS network, PS gateway node(s) 1418 can be embodied in gateway GPRS support node(s) (GGSN).

In addition to receiving and processing CS-switched traffic and signaling, PS gateway node(s) 1418 can authorize and authenticate PS-based data sessions with served (e.g., through macro RAN) wireless devices. Data sessions can include traffic exchange with networks external to the macro network platform 1410, like wide area network(s) (WANs)

1450, enterprise networks (NW(s)) 1470 (e.g., enhanced 911), or service NW(s) 1480 like IP multimedia subsystem (IMS); it should be appreciated that local area network(s) (LANs), which may be a part of enterprise NW(s), can also be interfaced with macro network platform 1410 through PS gateway node(s) 1418. Packet-switched gateway node(s) 1418 generates packet data contexts when a data session is established. To that end, in an aspect, PS gateway node(s) 1418 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1414. It is to be noted that in 3GPP UMTS network(s), PS gateway node(s) 1418 (e.g., GGSN) and tunnel interface (e.g., TTG) comprise a packet data gateway (PDG).

Macro network platform 1410 also includes serving node(s) 1416 that convey the various packetized flows of information, or data streams, received through PS gateway node(s) 1418. As an example, in a 3GPP UMTS network, serving node(s) can be embodied in serving GPRS support node(s) (SGSN).

As indicated above, server(s) 1414 in macro network platform 1410 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1410. Data streams can be conveyed to PS gateway node(s) 1418 for authorization/authentication and initiation of a data session, and to serving node(s) 1416 for communication thereafter. Server(s) 1414 can also effect security (e.g., implement one or more firewalls) of macro network platform 1410 to ensure network's operation and data integrity in addition to authorization and authentication procedures that CS gateway node(s) 1412 and PS gateway node(s) 1418 can enact. Moreover, server(s) 1414 can provision services from external network(s), e.g., WAN 1450, or Global Positioning System (GPS) network(s), which can be a part of enterprise NW(s) 1480. It is to be noted that server(s) 1414 can include one or more processor configured to confer at least in part the functionality of macro network platform 1410. To that end, the one or more processor can execute code instructions stored in memory 1430, for example.

In example wireless environment 1400, memory 1430 stores information related to operation of macro network platform 1410. Information can include business data associated with subscribers; market plans and strategies, e.g., promotional campaigns, business partnerships; operational data for mobile devices served through macro network platform; service and privacy policies; end-user service logs for law enforcement; and so forth. Memory 1430 can also store information from at least one of telephony network(s) 1440, WAN 1450, SS7 network 1460, enterprise NW(s) 1470, or service NW(s) 1480.

Regarding femto network platform 1480, it includes a femto gateway node(s) 1484, which have substantially the same functionality as PS gateway node(s) 1418. Additionally, femto gateway node(s) 1484 can also include substantially all functionality of serving node(s) 1416. Disparate gateway node(s) 1484 can control or operate disparate sets of deployed femto APs, which can be a part of femto RAN 1490. In an aspect of the subject embodiment, femto gateway node(s) 1484 can aggregate operational data received from deployed femto APs. Moreover, femto gateway node(s) 1484, can convey received attachment signaling to attachment component 1420. It should be appreciated that while attachment component is illustrated as external to gateway node(s) 1484, attachment component 1420 can be an integral part of gateway node(s) 1484.

Management component 1420 can facilitate delivery of home macro sector identifiers (e.g., HMS ID(s) 666) and a scanning requirement(s) (e.g., scanning requirement(s) 664). It is noted that while management component 1420 is illustrated as residing within femto network platform 1480, in alternative or additional scenarios, it can reside within macro network platform 1410, or distributed among macro and femto network platforms.

Memory 1486 can retain additional information relevant to operation of the various components of femto network platform 1480. For example operational information that can be stored in memory 1486 can comprise, but is not limited to, subscriber intelligence; contracted services; maintenance and service records; femto cell configuration (e.g., devices served through femto RAN 1490; authorized subscribers associated with one or more deployed femto APs); service policies and specifications; privacy policies; add-on features; so forth.

Server(s) 1482 have substantially the same functionality as described in connection with server(s) 1414. In an aspect, server(s) 1482 can execute multiple application(s) that provide service (e.g., voice and data) to wireless devices served through femto RAN 1490. Server(s) 1482 can also provide security features to femto network platform. In addition, server(s) 1482 can manage (e.g., schedule, queue, format . . . ) substantially all packetized flows (e.g., IP-based, frame relay-based, ATM-based) it generates in addition to data received from macro network platform 1410. Furthermore, server(s) 1482 can effect provisioning of femto cell service, and effect operations and maintenance. It is to be noted that server(s) 1482 can include one or more processors configured to provide at least in part the functionality of femto network platform 1480. To that end, the one or more processors can execute code instructions stored in memory 1486, for example.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

It should be appreciated that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity). Additionally, aspects, features, or advantages of the subject embodiments can be exploited in substantially any wireless telecommunication, or radio, technology; for example, Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), High Speed Downlink Packet Access (HSDPA), High Speed Uplink Packet Access (HSUPA), or LTE Advanced. Moreover, substantially all aspects of the subject embodiments can include legacy telecommunication technologies.

What has been described above includes examples of systems and methods that provide advantages of the subject embodiments. It is, of course, not possible to describe every conceivable combination of components or methodologies for purposes of describing the subject embodiments, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
in response to an indication that a user equipment received data related to a sector being defined as a home macro sector,
linking first identifier data related to the sector to second identifier data associated with the user equipment,
updating an access data structure associated with a macro access point device, resulting in an updated access data structure; and
based on a determination that the user equipment has not received the data related to the sector being defined as the home macro sector, adding identification data to the access data structure identifying the user equipment as having not received the data, and removing the second identifier data associated with the user equipment from the access data structure.

2. The system of claim 1, wherein the operations further comprise:
in response to the sector being determined to be defined as the home macro sector, facilitating access, on behalf of the user equipment, to the macro access point device.

3. The system of claim 2, wherein the data is a first data, and wherein the identification data comprises second data representative of an availability status of the home macro sector.

4. The system of claim 1, wherein the identification data comprises an international mobile equipment identifier associated with the user equipment.

5. The system of claim 1, wherein the indication is a first indication, and wherein the operations further comprise:
in response to the removing the second identifier data associated with the user equipment from the access data structure, sending a second indication of the removing to the user equipment.

6. The system of claim 1, wherein the determination is a first determination, and wherein the operations further comprise:
based on a second determination that the user equipment is awaiting the reception of the data related to the sector being defined as the home macro sector, restricting access, of the user equipment, to the macro access point device.

7. A method, comprising:
in response to a user equipment being determined to be coupled to a macro access point device, directing, by a system comprising a processor to the user equipment, data related to a sector associated with the macro access point device being defined as a home macro sector;
in response to linking first identifier data associated with the sector to second identifier data associated with the user equipment, updating, by the system, an access control data structure associated with the macro access point device; and
based on a determination that the user equipment has not received the data related to the sector being defined as the home macro sector, adding, by the system, identification data to the access control data structure, wherein the identification data identifies the user equipment as having not received the data, and removing, by the system, the second identifier data associated with the user equipment from the access data structure.

8. The method of claim 7, further comprising:
based on the determination that the user equipment has not received the data related to the sector being defined as the home macro sector, removing, by the system, identification data associated with the user equipment from the access control data structure.

9. The method of claim 7, wherein the data related to the sector being defined as the home macro sector is first data, wherein the home macro sector is a first home macro sector, and wherein the method further comprises:
in response to the determination that the user equipment has not received the first data related to the sector being defined as the first home macro sector, sending, by the system to the user equipment, second data instructing the user equipment to delete third data related to a second home macro sector.

10. The system of claim 7, wherein the data related to the sector being defined as the home macro sector is first data, wherein the home macro sector is a first home macro sector, and wherein the method further comprises:
in response to the determination that the user equipment has not received the first data related to the sector being defined as the first home macro sector, sending, by the system to the user equipment, second data instructing the user equipment to temporarily delete, for a defined amount of time, third data related to a second home macro sector.

11. The method of claim 7, wherein the macro access point device is a first macro access point device, wherein the home macro sector is a first home macro sector, and wherein the method further comprises:
determining, by the system, that a second macro access point device has been added to a macro wireless environment defining a second home macro sector.

12. The method of claim 11, wherein the data is first data, and wherein the method further comprises:
in response to the determining that the second home macro sector has been added, determining, by the system, whether the user equipment received second data related to the second home macro sector.

13. The method of claim 7, further comprising:
in response to the sector being determined to be defined as the home macro sector, granting, by the system, the user equipment access to the access point device.

14. The method of claim 7, further comprising:
adding, by the system, identification data related to the user equipment to a data structure associated with the access point device.

15. A non-transitory machine-readable storage medium, comprising executable instructions that, when executed by a processor, facilitate performance of operations, comprising:
determining first identifier data representing a sector related to a macro access point device within a macro wireless environment associated with an access point device;
in response to determining that a user equipment is coupled to the macro access point device, sending data related to the sector being defined as a home macro sector;
linking first identifier data representing the sector related to the macro access point device to second identifier data associated with the user equipment;
in response to the linking, updating an access data structure associated with the macro access point device; and
in response to a determination that the user equipment is awaiting reception of the data related to the sector being defined as the home macro sector, associating identification data with the access data structure, wherein the identification data identifies the user equipment as having not received the data, and removing the second identifier data associated with the user equipment from the access data structure.

16. The non-transitory machine-readable storage medium of claim 15, wherein the operations further comprise:
determining whether the user equipment received the data related to the home macro sector.

17. The non-transitory machine-readable storage medium of claim 15, wherein the operations further comprise:
in response to the determination that the user equipment is awaiting the reception of the data related to the home macro sector, restricting access to the access point device.

18. The non-transitory machine-readable storage medium of claim 15, wherein the operations further comprise:
in response to the determination that the user equipment is awaiting the reception of the data related to the sector being defined as the home macro sector, reconfiguring the access data structure.

19. The non-transitory machine-readable storage medium of claim 15, wherein the operations further comprise:
in response to the determination that the user equipment is awaiting the reception of the data related to the sector being defined as the home macro sector, modifying the access data structure.

20. The non-transitory machine-readable storage medium of claim 15, wherein the data related to the sector being defined as the home macro sector is first data, wherein the home macro sector is a first home macro sector, and wherein the operations further comprise:
in response to the determination that the user equipment is awaiting reception of the data related to the sector being defined as the home macro sector, sending to the user equipment, second data instructing the user equipment to provisionally delete, for a defined time period, third data related to a second home macro sector.

* * * * *